US012539671B2

(12) United States Patent
Watanabe et al.

(10) Patent No.: US 12,539,671 B2
(45) Date of Patent: Feb. 3, 2026

(54) THREE-DIMENSIONAL SHAPING DEVICE AND DATA GENERATION DEVICE

(71) Applicant: SEIKO EPSON CORPORATION, Tokyo (JP)

(72) Inventors: Manabu Watanabe, Shiojiri (JP); Makoto Omura, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 115 days.

(21) Appl. No.: 18/533,268

(22) Filed: Dec. 8, 2023

(65) Prior Publication Data

US 2024/0190077 A1 Jun. 13, 2024

(30) Foreign Application Priority Data

Dec. 9, 2022 (JP) .................... 2022-196866

(51) Int. Cl.
*B29C 64/35* (2017.01)
*B29C 64/118* (2017.01)
*B29C 64/209* (2017.01)
*B29C 64/236* (2017.01)
*B29C 64/245* (2017.01)
(Continued)

(52) U.S. Cl.
CPC ............ *B29C 64/35* (2017.08); *B29C 64/118* (2017.08); *B29C 64/209* (2017.08); *B29C 64/236* (2017.08); *B29C 64/245* (2017.08); *B33Y 30/00* (2014.12); *B33Y 40/00* (2014.12); *B33Y 50/02* (2014.12)

(58) Field of Classification Search
CPC ..... B29C 64/35; B29C 64/118; B29C 64/209; B29C 64/236; B29C 64/245; B29C 64/336; B29C 64/393; B33Y 30/00; B33Y 40/00; B33Y 50/02; B33Y 10/00
See application file for complete search history.

(56) References Cited

U.S. PATENT DOCUMENTS

2022/0234294 A1   7/2022  Akasaka
2022/0314545 A1*  10/2022 Bromberg .............. B33Y 40/00

FOREIGN PATENT DOCUMENTS

JP   2022-113927 A   8/2022
JP   2023-097689 A   7/2023

* cited by examiner

*Primary Examiner* — Charles R Kasenge
(74) *Attorney, Agent, or Firm* — Harness, Dickey & Pierce, P.L.C.

(57) ABSTRACT

A three-dimensional shaping device includes a position changing unit configured to change relative positions of a first head having a first nozzle and a stage and relative positions of a second head having a second nozzle and the stage, a cleaning part configured to clean the second nozzle, and a control unit. The control unit executes first deposition processing of depositing a layer of the first shaping material in a shaping region by extruding the first shaping material from the first nozzle while changing the relative positions of the first head and the stage, cleaning processing of cleaning the second nozzle using the cleaning part, and second deposition processing of depositing a layer of the second shaping material in the shaping region by extruding the second shaping material from the second nozzle while changing the relative positions of the second head and the stage after the cleaning processing. A start timing and an end timing of the cleaning processing are included in an execution period of the first deposition processing.

2 Claims, 12 Drawing Sheets

(51) Int. Cl.
*B33Y 30/00* (2015.01)
*B33Y 40/00* (2020.01)
*B33Y 50/02* (2015.01)

THREE-DIMENSIONAL SHAPING DEVICE AND DATA GENERATION DEVICE

The present application is based on, and claims priority from JP Application Serial Number 2022-196866, filed on Dec. 9, 2022, the disclosure of which is hereby incorporated by reference herein in its entirety.

BACKGROUND

1. Technical Field

The present disclosure relates to a three-dimensional shaping device and a data generation device.

2. Related Art

Regarding a three-dimensional shaping device, JP-A-2022-113927 discloses a technique of simultaneously cleaning a first nozzle that is provided in a first ejection unit and ejects a first shaping material and a second nozzle that is provided in a second ejection unit and ejects a second shaping material. By simultaneously cleaning the first nozzle and the second nozzle, a time required to clean can be shortened.

In the technique disclosed in JP-A-2022-113927, although the time required to clean nozzles can be shortened, a waiting time when a shaped object is not actually shaped may occur in the middle of shaping due to inability to extrude the shaping material from the first nozzle or the second nozzle during cleaning. There has been a demand for a technique capable of further preventing the waiting time due to such cleaning.

SUMMARY

According to a first aspect of the present disclosure, a three-dimensional shaping device is provided. The three-dimensional shaping device includes a stage, a first head having a first nozzle that extrudes a first shaping material toward the stage, a second head having a second nozzle that extrudes a second shaping material toward the stage, a position changing unit configured to change relative positions of the first head and the stage and relative positions of the second head and the stage, a cleaning part configured to clean the first nozzle and second nozzle, and a control unit configured to control the first head, the second head, and the position changing unit. The control unit executes first deposition processing of depositing a layer of the first shaping material in a shaping region on the stage by extruding the first shaping material from the first nozzle while changing the relative positions of the first head and the stage, cleaning processing of cleaning the second nozzle using the cleaning part, and second deposition processing of depositing a layer of the second shaping material in the shaping region by extruding the second shaping material from the second nozzle while changing the relative positions of the second head and the stage after the cleaning processing. A timing at which the cleaning processing is started and a timing at which the cleaning processing is ended are included in a period during which the first deposition processing is being executed.

According to a second aspect of the present disclosure, there is provided a data generation device that generates command data used in a three-dimensional shaping device including a first head having a first nozzle that extrudes a first shaping material and a second head having a second nozzle that extrudes a second shaping material. The data generation device includes a data generation unit configured to generate the command data based on shaping path data representing a movement path along which the nozzle moves while extruding the shaping material. The data generation unit generates, as the command data, first deposition command data to deposit a layer of the first shaping material in a shaping region on a stage by extruding the first shaping material from the first nozzle along the movement path, cleaning command data representing a command to execute cleaning of the second nozzle, and second deposition command data to deposit a layer of the second shaping material in the shaping region by extruding the second shaping material from the second nozzle along the movement path after the cleaning is executed. The first deposition command data includes a deposition start command to start deposition of the layer of the first shaping material by starting extrusion of the first shaping material from the first nozzle, and a deposition stop command to stop the deposition of the layer of the first shaping material by stopping the extrusion of the first shaping material from the first nozzle. The cleaning command data includes a cleaning start command to start the cleaning and a cleaning stop command to stop the cleaning. The data generation unit generates the cleaning start command and the cleaning stop command as commands to be executed between the deposition start command and the deposition stop command.

DESCRIPTION OF EMBODIMENTS

A. First Embodiment

Figure 1:
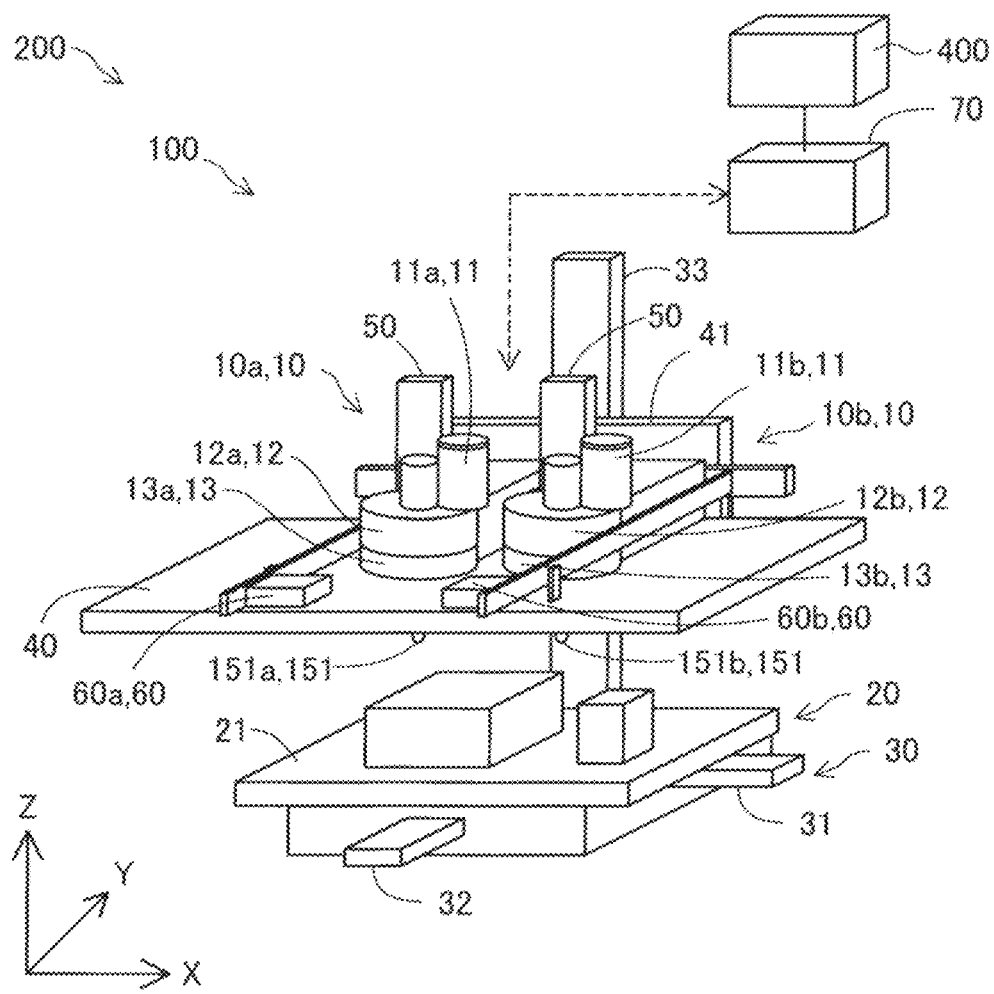
FIG. 1 is an explanatory diagram showing a schematic configuration of a three-dimensional shaping system.
Figure 2:
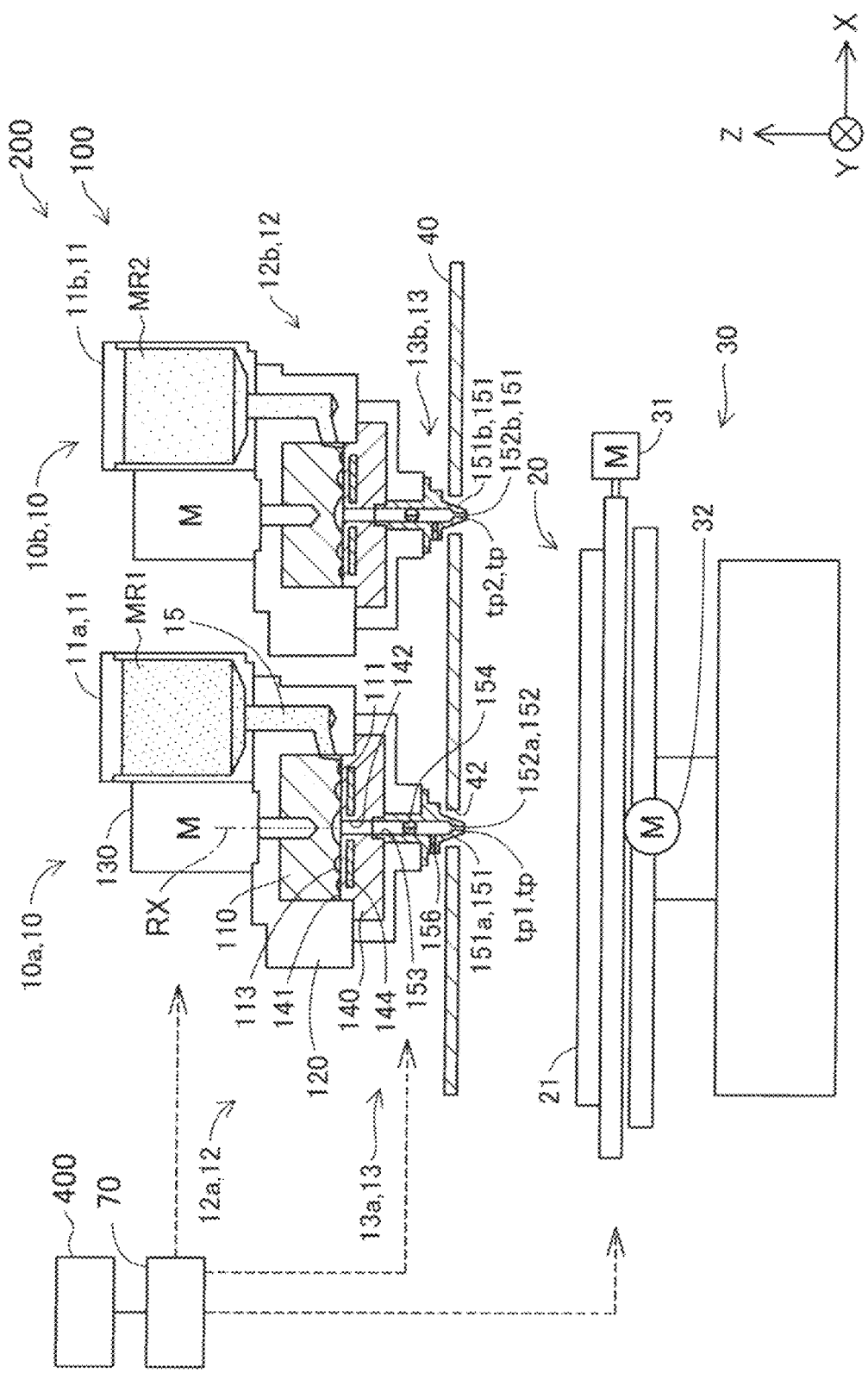
FIG. 2 is an explanatory diagram showing the schematic configuration of the three-dimensional shaping system.

FIGS. 1 and 2 are explanatory diagrams showing a schematic configuration of a three-dimensional shaping system 200 according to a first embodiment. FIGS. 1 and 2 show arrows indicating X, Y, and Z directions orthogonal to one another. The X direction and the Y direction are directions parallel to a horizontal plane, and the Z direction is a direction along a vertically upward direction. Other drawings also show arrows indicating the X, Y, and Z directions as appropriate such that directions shown in the drawings correspond to those in FIGS. 1 and 2. In the following description, when a direction is specified, a direction indicated by an arrow in each drawing is referred to as "+", a direction opposite thereto is referred to as "−", and both positive and negative signs are used for direction notation. Hereinafter, a +Z direction is also referred to as "upper", and a −Z direction is also referred to as "lower". A plane along the X direction and the Y direction is also referred to as an "XY plane".

The three-dimensional shaping system 200 includes a three-dimensional shaping device 100 and a data generation device 400. The three-dimensional shaping device 100 according to the embodiment is a device that shapes a shaped object by a material extrusion method. The three-dimensional shaping device 100 includes a control unit 70 that controls units of the three-dimensional shaping device 100. The control unit 70 and the data generation device 400 are communicably coupled to each other.

In addition to the control unit 70, the three-dimensional shaping device 100 includes a head 10, a stage 20, a position changing unit 30, a heating unit 40, a nozzle moving unit 50, and a cleaning part 60.

The control unit 70 is a control device that controls an overall operation of the three-dimensional shaping device. The control unit 70 is implemented by a computer including one or a plurality of processors, a memory, and an input and output interface that receives signals from the outside and outputs signals to the outside. The control unit 70 exerts various functions such as a function of executing shaping processing to shape a three-dimensional shaped object by the processor executing a program or a command read into a main storage device. Instead of being implemented by a computer, the control unit 70 may be implemented by a configuration of combining a plurality of circuits to implement at least some of the functions.

Under the control of the control unit 70, the head 10 extrudes a solid-state shaping material obtained by plasticizing a material into a paste, onto the stage 20 serving as a base of the three-dimensional shaped object. The head 10 includes a material supply unit 11, a plasticizing unit 12, and an extrusion unit 13.

The three-dimensional shaping device 100 includes a first head 10a and a second head 10b as the head 10. The first head 10a includes a first material supply unit 11a as the material supply unit 11, a first plasticizing unit 12a as the plasticizing unit 12, and a first extrusion unit 13a as the extrusion unit 13. The second head 10b includes a second material supply unit 11b as the material supply unit 11, a second plasticizing unit 12b as the plasticizing unit 12, and a second extrusion unit 13b as the extrusion unit 13. The first head 10a and the second head 10b are arranged side by side in the X direction such that positions in the Y direction coincide with each other. The second head 10b is disposed at a position in a +X direction of the first head 10a. Since a configuration of the first head 10a and a configuration of the second head 10b are the same, both may be simply referred to as the head 10 when not being particularly distinguished in the following description. In order to distinguish components of the first head 10a and the second head 10b, components of the first head 10a and components of the second head 10b are denoted by reference numerals "a" and "b", respectively.

The material supply unit 11 supplies a material to generate a shaping material to the plasticizing unit 12. The material supply unit 11 is implemented by, for example, a hopper. The material supply unit 11 accommodates a pellet-shaped or powdery material. For example, thermoplastic resins such as polypropylene resin (PP), polyethylene resin (PE), and polyacetal resin (POM) are used as the material. The first material supply unit 11a accommodates a first material MR1 to generate a first shaping material as the above-described material. The second material supply unit 11b accommodates a second material MR2 to generate a second shaping material as the above-described material. In the embodiment, the first shaping material is a main body material to shape a main body portion to be described later. The second shaping material is, for example, a support material to shape a support structure that supports the main body portion.

A communication path 15 coupling the material supply unit 11 and the plasticizing unit 12 is provided below the material supply unit 11. The material supply unit 11 supplies the material to the plasticizing unit 12 via the communication path 15.

The plasticizing unit 12 plasticizes at least a part of the material supplied from the material supply unit 11, generates a paste-shaped shaping material having fluidity, and guides the shaping material to the extrusion unit 13. "Plasticizing" is a concept including melting, and means changing from a solid state to a flowable state. Specifically, for a material in which glass transition occurs, plasticizing means setting a temperature of the material to be equal to or higher than a glass transition point. For a material in which glass transition does not occur, plasticizing means setting a temperature of the material to be equal to or higher than a melting point. The first plasticizing unit 12a plasticizes at least a part of the first material MR1 to generate the first shaping material as the shaping material. The second plasticizing unit 12b plasticizes at least a part of the second material MR2 to generate the second shaping material as the shaping material.

The plasticizing unit 12 includes a screw 110, a screw case 120, a drive motor 130, and a barrel 140.

The screw 110 is accommodated in the screw case 120. An upper surface side of the screw 110 is coupled to the drive motor 130. The screw 110 is rotated in the screw case 120 by a rotational driving force generated by the drive motor 130. An axial direction of a rotation axis RX of the screw 110 is a direction along the Z direction. A rotation speed of the screw 110 is controlled by controlling a rotation speed of the drive motor 130 by the control unit 70. The screw 110 may be driven by the drive motor 130 via a speed reducer. The screw 110 is also called a rotor or a flat screw.

The barrel 140 is installed on a −Z direction side of the screw 110. A facing surface 141 that is an upper surface of the barrel 140 faces a groove formation surface 111 that is a lower surface of the screw 110. A communication hole 142 communicating with a flow path 153 of the extrusion unit 13 is formed at a center of the barrel 140. A plasticizing heater 144 is provided in the barrel 140. A temperature of the plasticizing heater 144 is controlled by the control unit 70.

Figure 3:
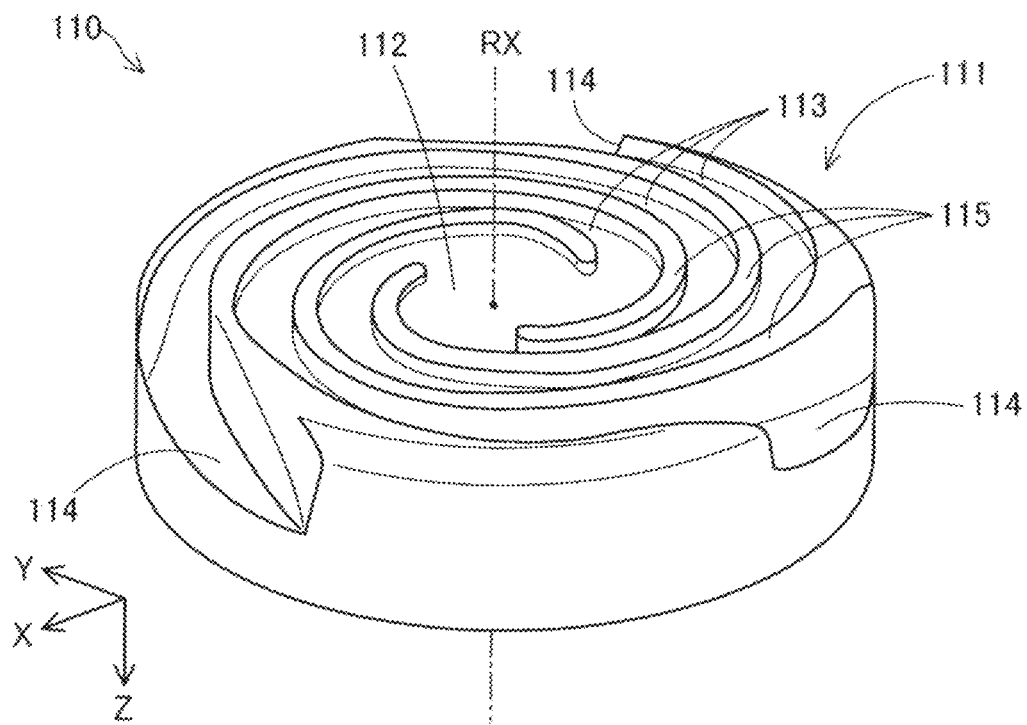
FIG. 3 is a perspective view showing a schematic configuration of a screw.

FIG. 3 is a perspective view showing a schematic configuration of the screw 110. The screw 110 has a substantially cylindrical shape in which a length in a direction along the rotation axis RX is smaller than a length in a direction perpendicular to the rotation axis RX. Spiral grooves 113 are formed in the groove formation surface 111 around a central portion 112. The groove 113 communicates with a material inlet 114 formed in a side surface of the screw 110. The material supplied from the material supply unit 11 is supplied to the groove 113 through the material inlet 114. The grooves 113 are formed by being separated by ridge portions 115. Although FIG. 3 shows an example in which three grooves 113 are formed, the number of grooves 113 may be one, or two or more. The groove 113 is not limited to a spiral shape, and may have a helical shape, an involute curve shape, or a shape extending in an arc shape from the central portion 112 toward an outer periphery.

Figure 4:
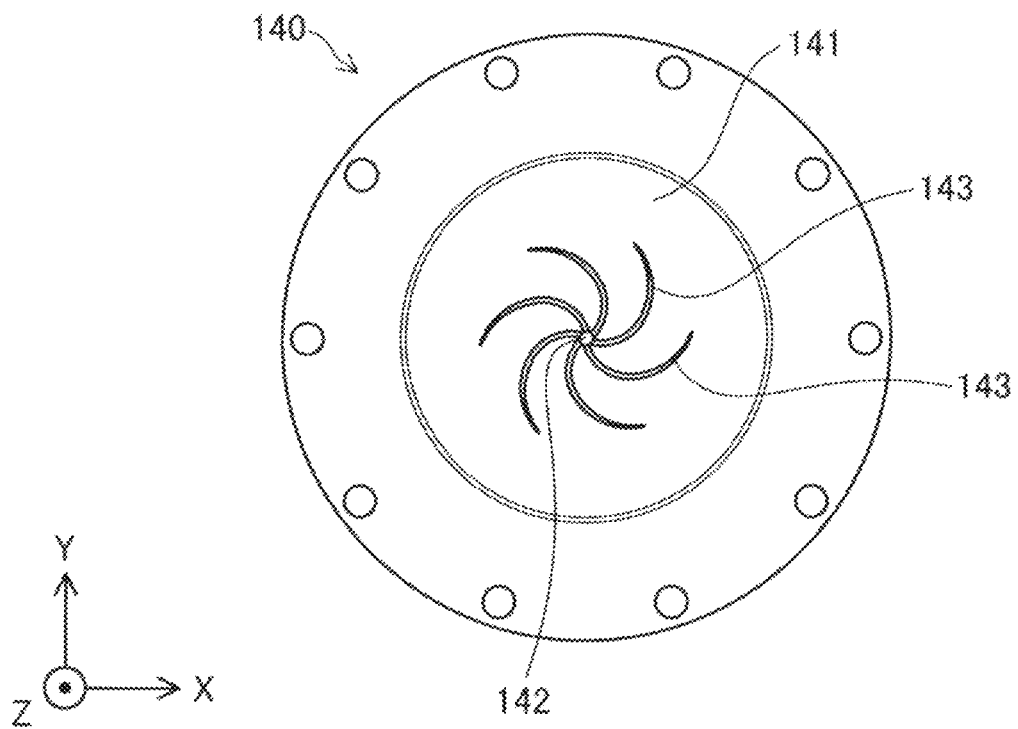
FIG. 4 is a schematic plan view of a barrel.

FIG. 4 is a schematic plan view of the barrel 140. A plurality of guide grooves 143 are formed around the communication hole 142 in the facing surface 141. One end of each guide groove 143 is coupled to the communication hole 142, and extends spirally from the communication hole 142 toward an outer periphery of the facing surface 141. One end of the guide groove 143 may not be coupled to the communication hole 142. The guide groove 143 may not be formed in the barrel 140.

The material supplied to the groove 113 in the screw 110 flows along the groove 113 while being plasticized in the groove 113 by rotation of the screw 110 and heating of the plasticizing heater 144, and is guided to the central portion 112 of the screw 110 as the shaping material. The paste-shaped shaping material having fluidity flowed into the central portion 112 is supplied to the extrusion unit 13 through the communication hole 142. Not all types of substances forming the shaping material need to be plasticized in the plasticizing unit 12. The shaping material may be converted into a flowable state as a whole by plasticizing at least some types of the substances forming the shaping material.

The extrusion unit 13 extrudes the shaping material. The extrusion unit 13 includes a nozzle 151, the flow path 153, an extrusion adjustment unit 154, and a suction unit 156.

The nozzle 151 is coupled to the communication hole 142 of the barrel 140 through the flow path 153. The nozzle 151 extrudes the shaping material generated in the plasticizing unit 12 toward the stage 20 from a nozzle opening 152 that is an opening formed in a tip portion tp of the nozzle 151. More specifically, a first nozzle 151a extrudes a first shaping material from a first nozzle opening 152a formed in a first tip portion tp1. A second nozzle 151b extrudes a second shaping material from a second nozzle opening 152b formed in a second tip portion tp2.

The extrusion adjustment unit 154 is provided in the flow path 153 and adjusts an opening degree of the flow path 153. In the embodiment, the extrusion adjustment unit 154 is implemented by a butterfly valve, and changes an opening area of the flow path 153 by rotating in the flow path 153. The extrusion adjustment unit 154 is driven by a drive unit (not shown) under the control of the control unit 70. The drive unit that drives the extrusion adjustment unit 154 is implemented by, for example, a stepping motor. The control unit 70 can adjust a flow rate of the shaping material flowing from the plasticizing unit 12 to the nozzle 151, that is, an extrusion amount of the shaping material extruded from the nozzle 151, by controlling a rotation angle of the butterfly valve. The extrusion adjustment unit 154 can adjust the extrusion amount of the shaping material and can control ON and OFF of an outflow of the shaping material. A shape of the butterfly valve may be any shape as long as the butterfly valve adjusts the opening degree of the flow path 153 by rotating in the flow path 153, and may be, for example, a plate shape or a hemispherical shape. In another embodiment, the extrusion adjustment unit 154 may be implemented as, for example, a piston mechanism that adjusts the opening degree of the flow path 153 by an operation of a piston or a shutter mechanism that adjusts the opening degree of the flow path 153 by opening and closing of a shutter.

The suction unit 156 is coupled between the extrusion adjustment unit 154 and the nozzle opening 152 in the flow path 153. The suction unit 156 temporarily sucks the shaping material in the flow path 153 when extrusion of the shaping material from the nozzle 151 stops, thereby preventing a tailing phenomenon in which the shaping material drips while pulling a thread from the nozzle opening 152. The suction unit 156 includes a plunger. The suction unit 156 is controlled by the control unit 70. The suction unit 156 is driven by a drive unit (not shown) under the control of the control unit 70. The drive unit that drives the suction unit 156 is implemented by, for example, a stepping motor, a rack-pinion mechanism that converts a rotational force of the stepping motor into a translational motion of the plunger, or the like.

The stage 20 is disposed at a position facing the nozzle opening 152 of the nozzle 151. The three-dimensional shaping device 100 shapes the three-dimensional shaped object by extruding the shaping material from the nozzle 151 onto a shaping surface 21 that is an upper surface of the stage 20 to deposit shaping layers. A region on the shaping surface 21 where the three-dimensional shaped object is shaped is also referred to as a shaping region.

The position changing unit 30 changes relative positions of the first head 10a and the stage 20 and relative positions of the second head 10b and the stage 20. In the embodiment, the second head 10b is configured such that a position thereof relative to the stage 20 changes together with the first head 10a. By implementing the second head 10b in this manner, it is possible to efficiently shape the three-dimensional shaped object by moving the second nozzle 151b together with the first nozzle 151a while easily preventing interference between the second head 10b and the first head 10a during shaping.

More specifically, as shown in FIG. 1, the position changing unit 30 according to the embodiment includes a first electric actuator 31 that moves the stage 20 along the X direction, a second electric actuator 32 that moves the stage 20 and the first electric actuator 31 along the Y direction, and a third electric actuator 33 that moves the head 10 along the Z direction. The third electric actuator 33 moves the first head 10a and the second head 10b along the Z direction by moving, along the Z direction, a movable portion 41 to which the first head 10a and the second head 10b are fixed. That is, the first electric actuator 31 and the second electric actuator 32 move the stage 20 along a horizontal direction with respect to the first head 10a and the second head 10b. The third electric actuator 33 moves the first head 10a and the second head 10b along the Z direction with respect to the stage 20. In FIG. 2, the third electric actuator 33 and the movable portion 41 are omitted.

The first electric actuator 31, the second electric actuator 32, and the third electric actuator 33 described above are driven under the control of the control unit 70. For example, the position changing unit 30 may move the stage 20 in the Z direction, may move the first head 10a and the second head 10b along the X direction and the Y direction, may move the stage 20 in the X direction, the Y direction, and the Z direction without moving the first head 10a and the second head 10b, or may move the first head 10a and the second head 10b in the X direction, the Y direction, and the Z direction without moving the stage 20.

The heating unit 40 heats the shaping material deposited on the stage 20. The heating unit 40 has a plate shape having a heater and is fixed to the movable portion 41. The heating unit 40 is configured such that a position thereof relative to the stage 20 changes together with the first head 10a and the second head 10b. More specifically, in the embodiment, the heating unit 40 is moved in the Z direction together with the head 10 by the third electric actuator 33. As shown in FIG. 2, the heating unit 40 has an opening 42 penetrating the heating unit 40 in the Z direction.

The nozzle moving unit 50 shown in FIG. 1 changes relative positions of the nozzle 151 and the heating unit 40. The three-dimensional shaping device 100 is provided with two nozzle moving units 50 corresponding to the first head 10a and the second head 10b. Each nozzle moving unit 50 is fixed to the movable portion 41, and is moved in the Z direction together with the heating unit 40 by the third electric actuator 33. The nozzle moving unit 50 is implemented as an electric actuator, for example, and is driven under the control of the control unit 70. The nozzle moving unit 50 changes the relative positions of the nozzle 151 and the heating unit 40 by moving the head 10 in the Z direction. In the embodiment, one nozzle moving unit 50 moves the first head 10a in the Z direction, and the other nozzle moving unit 50 moves the second head 10b in the Z direction. The nozzle moving units 50 are individually controlled by the control unit 70. In another embodiment, for example, the nozzle moving unit 50 may move only the extrusion unit 13 in the Z direction instead of the entire head 10. In FIG. 2, the nozzle moving unit 50 is omitted.

In the embodiment, each of the first nozzle 151a and the second nozzle 151b is switchable between a shaping state and a retracted state by the nozzle moving unit 50. The shaping state refers to a state in which at least a part of the nozzle 151 is disposed in the opening 42. The tip portion tp of the nozzle 151 in the shaping state is disposed between the heating unit 40 and the stage 20 in the Z direction. The retracted state refers to a state in which the nozzle 151 is disposed outside the opening 42 by disposing the nozzle 151 above the opening 42. The nozzle moving unit 50 moves the head 10 in the +Z direction when the nozzle 151 is switched from the shaping state to the retracted state, and moves the head 10 in the -Z direction when the nozzle 151 is switched from the retracted state to the shaping state. In the embodiment, both the first nozzle 151a and the second nozzle 151b can be in the shaping state simultaneously, and be in the retracted state simultaneously. However, even when both the first nozzle 151a and the second nozzle 151b are in the shaping state simultaneously, the shaping material is not extruded from both the nozzles 151 simultaneously, but from one nozzle 151 at a time, onto the shaping region at the time of shaping the three-dimensional shaped object.

Figure 5:
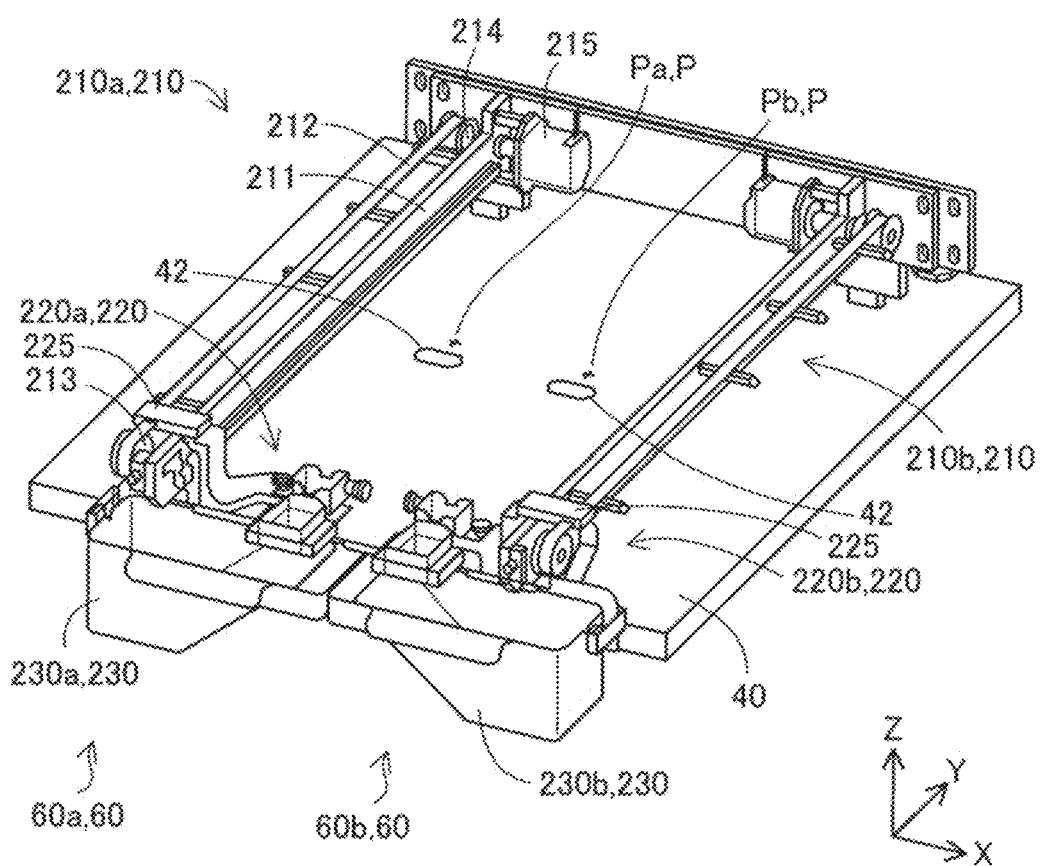
FIG. 5 is a perspective view of a cleaning part.

FIG. 5 is a perspective view of the cleaning part 60. In the embodiment, the cleaning part 60 is fixed to the heating unit 40, and is moved in the Z direction together with the heating unit 40 by the third electric actuator 33.

The cleaning part 60 includes a cleaning moving unit 210, a cleaning unit 220, and a waste material accommodating unit 230. In the embodiment, the cleaning part 60 includes a first cleaning portion 60a and a second cleaning portion 60b. The first cleaning portion 60a includes a first cleaning moving unit 210a as the cleaning moving unit 210, a first cleaning unit 220a as the cleaning unit 220, and a first waste material accommodating unit 230a as the waste material accommodating unit 230. The second cleaning portion 60b includes a second cleaning moving unit 210b as the cleaning moving unit 210, a second cleaning unit 220b as the cleaning unit 220, and a second waste material accommodating unit 230b as the waste material accommodating unit 230. The first cleaning portion 60a cleans the first nozzle 151a, and the second cleaning portion 60b cleans the second nozzle 151b. The first cleaning portion 60a and the second cleaning portion 60b have the same configuration. When components of the first cleaning portion 60a and the second cleaning portion 60b are distinguished from each other, components of the first cleaning portion 60a are denoted by a reference numeral "a", and components of the second cleaning portion 60b are denoted by a reference numeral "b".

The cleaning unit 220 is configured such that a position thereof relative to the stage 20 changes together with the first head 10a and the second head 10b. In the embodiment, the position of the cleaning unit 220 relative to the stage 20 changes together with the heating unit 40. More specifically, in the embodiment, the cleaning part 60 is moved along the Z direction with respect to the stage 20 together with the first head 10a and the second head 10b by the third electric actuator 33, and the stage 20 is moved along the horizontal direction with respect to the first head 10a, the second head 10b, and the cleaning part 60 by the first electric actuator 31 and the second electric actuator 32. When the entire cleaning part 60 moves with respect to the stage 20 in this manner, the position of the cleaning unit 220 relative to the stage 20 changes.

The cleaning moving unit 210 moves the cleaning unit 220 with respect to the nozzle 151. The cleaning moving unit 210 is fixed to an upper surface of the heating unit 40. The cleaning moving unit 210 includes a guide frame 211, a drive belt 212, a first reel 213, a second reel 214, and a belt drive unit 215. The guide frame 211 is provided along the Y direction. The first reel 213 is provided on an end portion of the guide frame 211 on a -Y direction side. The second reel 214 is provided on an end portion of the guide frame 211 on a +Y direction side. The drive belt 212 is bridged between the first reel 213 and the second reel 214, one end of which is rolled around the first reel 213 and the other end of which is rolled around the second reel 214. The belt drive unit 215 rolls or unrolls the drive belt 212 by driving the first reel 213 and the second reel 214 in a rotating manner. The belt drive unit 215 is implemented by, for example, a motor, and is controlled by the control unit 70.

The cleaning unit 220 is disposed above the heating unit 40 and is coupled to the cleaning moving unit 210 via a coupling portion 225. The coupling portion 225 fixes the cleaning unit 220 to the drive belt 212 by sandwiching and fixing the drive belt 212. The coupling portion 225 is attached to the guide frame 211 such that the cleaning unit 220 is movable in the Y direction. Therefore, the cleaning unit 220 moves in the Y direction along the guide frame 211 by rolling or unrolling the drive belt 212 on the first reel 213 and the second reel 214. As described above, the cleaning unit 220 is movable with respect to the nozzle 151 by the cleaning moving unit 210 while being moved with respect to the stage 20 together with the nozzle 151 by the position changing unit 30.

Figure 6:
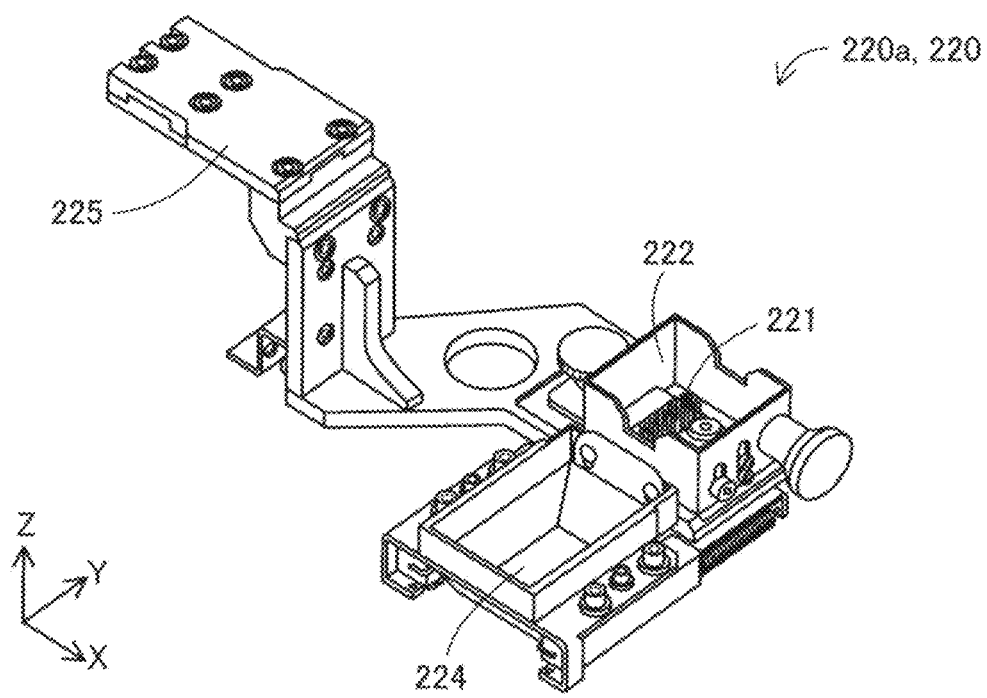
FIG. 6 is a perspective view of a cleaning unit.

FIG. 6 is a perspective view of the cleaning unit 220. FIG. 6 shows the first cleaning unit 220a. The cleaning unit 220 includes a cleaning member 221, a cleaning box 222, and a collection portion 224. The cleaning member 221 removes foreign matter adhering to the tip portion tp by contact with the tip portion tp of the nozzle 151. In the embodiment, the cleaning member 221 is implemented as a brush. A shape of the cleaning box 222 is a box shape having an upper opening. The cleaning member 221 is fixed to a bottom surface in the cleaning box 222 such that a bristle tip of the brush faces the +Z direction. The collection portion 224 collects the shaping material discharged from the nozzle 151 by purge processing to be described later. In the embodiment, the collection portion 224 is provided adjacent to the cleaning member 221. A shape of the collection portion 224 is a box shape having an upper opening. A bottom surface of the collection portion 224 is openable and closable. In another embodiment, the cleaning member 221 may include a wiper or a blade having no bristles in addition to or instead of the brush. The collection portion 224 does not have to have a box shape as long as it can support the shaping material discharged from the nozzle 151, and may be, for example, a flat plate shape or a trapezoidal shape.

The waste material accommodating unit 230 shown in FIG. 5 stores the shaping material discharged from the nozzle 151 to the collection portion 224. The waste material accommodating unit 230 is detachably attached to an end portion of the heating unit 40 on the −Y direction side. The waste material accommodating unit 230 has a box shape with an upper portion opened. When the shaping material is collected from the collection portion 224 to the waste material accommodating unit 230, first, the collection portion 224 is moved to a position above the waste material accommodating unit 230 by the cleaning moving unit 210. Then, the control unit 70 opens a bottom surface of the collection portion 224, and the shaping material in the collection portion 224 falls into the waste material accommodating unit 230.

In the embodiment, the control unit 70 executes purge processing and tip portion cleaning processing as processing to clean the nozzle 151 using the cleaning part 60. The purge processing refers to processing of discharging the shaping material from the nozzle 151 to a region different from the shaping region. The tip portion cleaning processing refers to processing of removing foreign matter adhering to the tip portion tp by bringing the cleaning member 221 into contact with the tip portion tp of the nozzle 151. In the embodiment, the purge processing and the tip portion cleaning processing are executed on the nozzle 151 in the retracted state.

Figure 7:
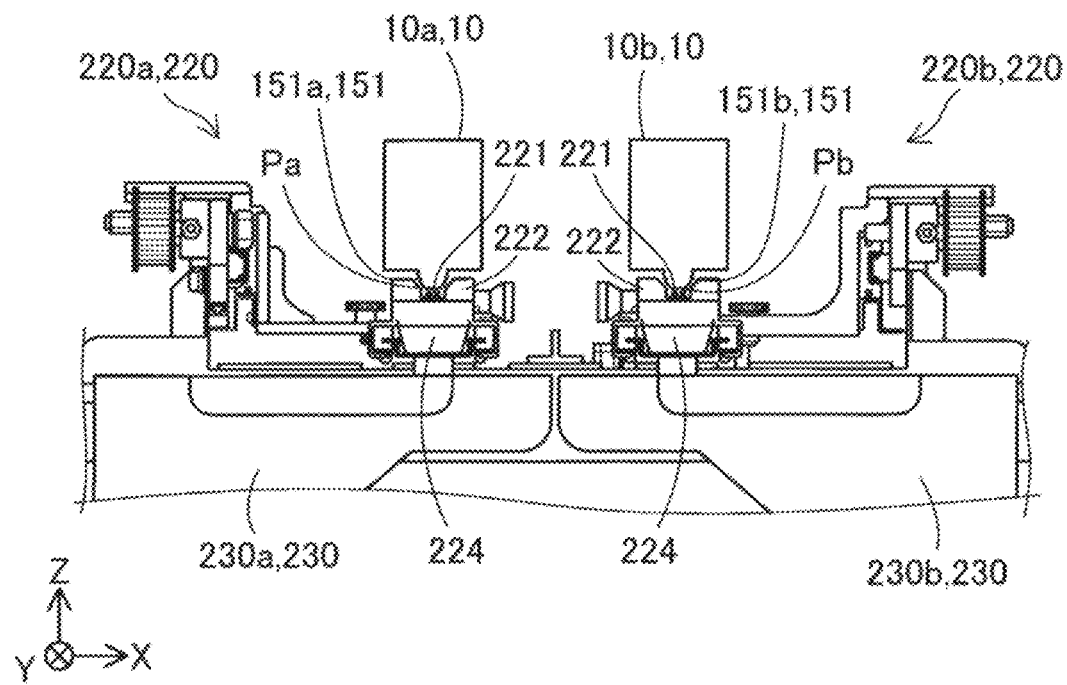
FIG. 7 is a side view showing a positional relationship between a shaping nozzle and a cleaning unit during purging.

FIG. 7 is a side view showing a positional relationship between the nozzle 151 and the cleaning unit 220 in the purge processing. For example, in the purge processing of discharging the second shaping material from the second nozzle 151b, the control unit 70 controls the nozzle moving unit 50 to move the second extrusion unit 13b in the +Z direction, thereby moving the second nozzle 151b from a position below the second cleaning unit 220b to a cleaning position Pb. The control unit 70 controls the cleaning moving unit 210 to move the second cleaning unit 220b to a position below the second nozzle 151b such that the collection portion 224 is located directly below the second nozzle 151b. Then, the control unit 70 controls the extrusion adjustment unit 154 of the second head 10b to discharge the second shaping material from the second nozzle 151b into the collection portion 224, which is a region different from the shaping region. In the purge processing, for example, after the shaping material is discharged from the nozzle 151, the control unit 70 may cause the nozzle 151 to stand by for a predetermined time while keeping the nozzle 151 located at a cleaning position P. By causing the nozzle 151 to stand by in this manner, it is possible to prevent the shaping material used in the purge processing from dripping from the nozzle 151 in the subsequent processing of the purge processing.

For example, in the tip portion cleaning processing of cleaning the second tip portion tp2 of the second nozzle 151b, the control unit 70 moves the second cleaning unit 220b to a position below the second nozzle 151b such that the cleaning member 221 is rubbed against the second tip portion tp2. Accordingly, the shaping material as the foreign matter adhering to the second tip portion tp2 is removed. In the tip portion cleaning processing, it is particularly prefer-able to remove the shaping material as the foreign matter adhering to the nozzle opening 152 or the vicinity thereof. The foreign matter thus removed is collected in the cleaning box 222. In the embodiment, the control unit 70 executes the tip portion cleaning processing after the purge processing. By doing so, the nozzle 151 can be cleaned more effectively.

In another embodiment, for example, the control unit 70 may execute only one of the purge processing and the tip portion cleaning processing. When the control unit 70 executes only the purge processing, the cleaning unit 220 may include at least the collection portion 224. When the control unit 70 executes only the tip portion cleaning processing, the cleaning unit 220 may include at least the cleaning member 221.

Figure 8:
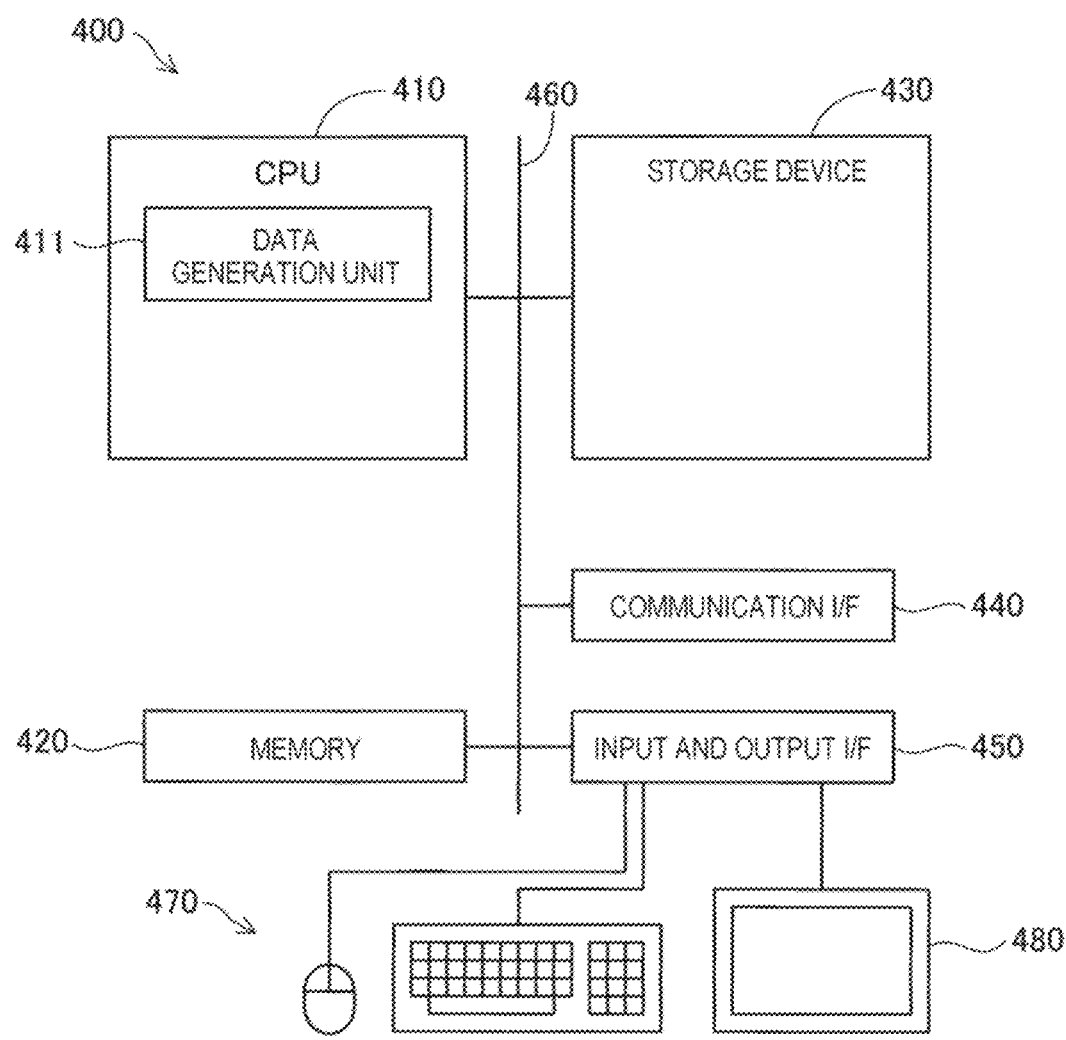
FIG. 8 is an explanatory diagram showing a schematic configuration of a data generation device.

FIG. 8 is an explanatory diagram showing a schematic configuration of the data generation device 400. The data generation device 400 is implemented as a computer in which a CPU 410, a memory 420, a storage device 430, a communication interface 440, and an input and output interface 450 are intercoupled by a bus 460. An input device 470 such as a keyboard and a mouse and a display device 480 such as a liquid crystal display are coupled to the input and output interface 450. The data generation device 400 is coupled to the control unit 70 of the three-dimensional shaping device 100 via the communication interface 440.

The CPU 410 functions as a data generation unit 411 by executing a program stored in the storage device 430. The data generation unit 411 generates command data to be described later.

Figure 9:
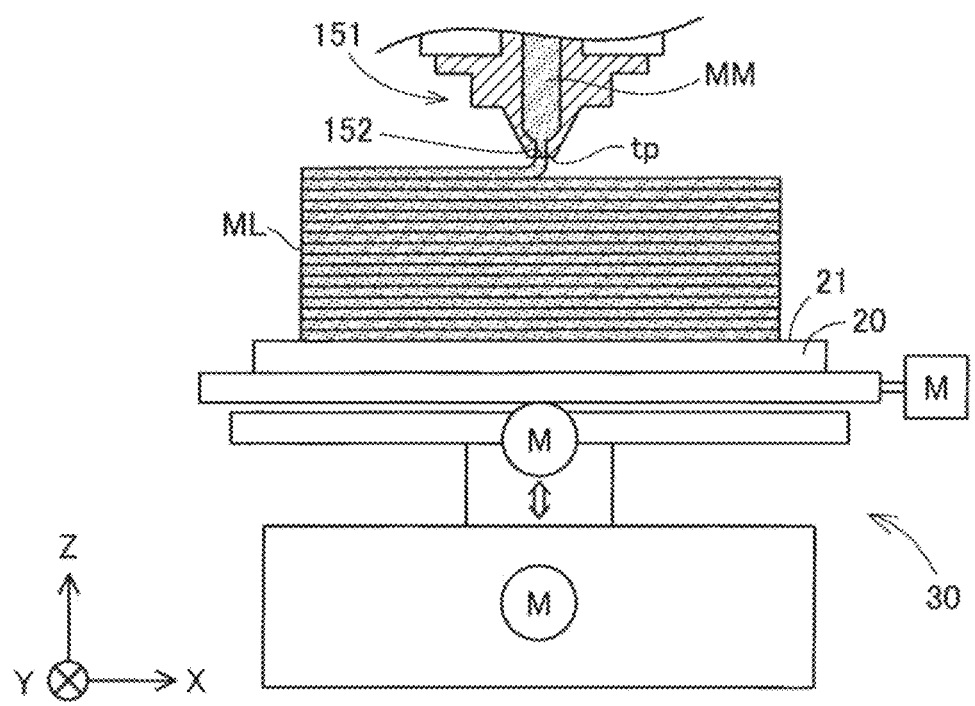
FIG. 9 is an explanatory diagram schematically showing a state in which a three-dimensional shaped object is shaped.

FIG. 9 is an explanatory diagram schematically showing a state in which a three-dimensional shaped object is shaped in the three-dimensional shaping device 100. In the three-dimensional shaping device 100, as described above, in the plasticizing unit 12, the solid-state material supplied to the groove 113 in the rotating screw 110 is plasticized to generate a shaping material MM. The control unit 70 discharges the shaping material MM from the nozzle 151 while changing a position of the nozzle 151 with respect to the stage 20 in a direction along the shaping surface 21 of the stage 20, by controlling the position changing unit 30 while maintaining a distance between the shaping surface 21 on the stage 20 and the nozzle 151. The shaping material MM extruded from the nozzle 151 is continuously deposited in a moving direction of the nozzle 151 to form a layer ML. After forming one layer ML, the control unit 70 lowers the stage 20 to move the position of the nozzle 151 with respect to the stage 20 in the +Z direction. Then, the three-dimensional shaped object is shaped by further depositing the layer ML on the layer ML formed so far.

For example, the control unit 70 may temporarily interrupt movement of the nozzle 151 in the Z direction when one layer ML is completed, or extrusion of the shaping material MM from the nozzle 151 when there are a plurality of independent shaping regions in layers ML. In this case, the control unit 70 causes the extrusion adjustment unit 154 to close the flow path 153, stops the extrusion of the shaping material MM from the nozzle opening 152, and causes the suction unit 156 to temporarily suck the shaping material MM in the nozzle 151. After changing the position of the nozzle 151, the control unit 70 causes the extrusion adjustment unit 154 to open the flow path 153 while discharging the shaping material MM in the suction unit 156, thereby resuming deposition of the shaping material MM from the changed position of the nozzle 151.

Figure 10:
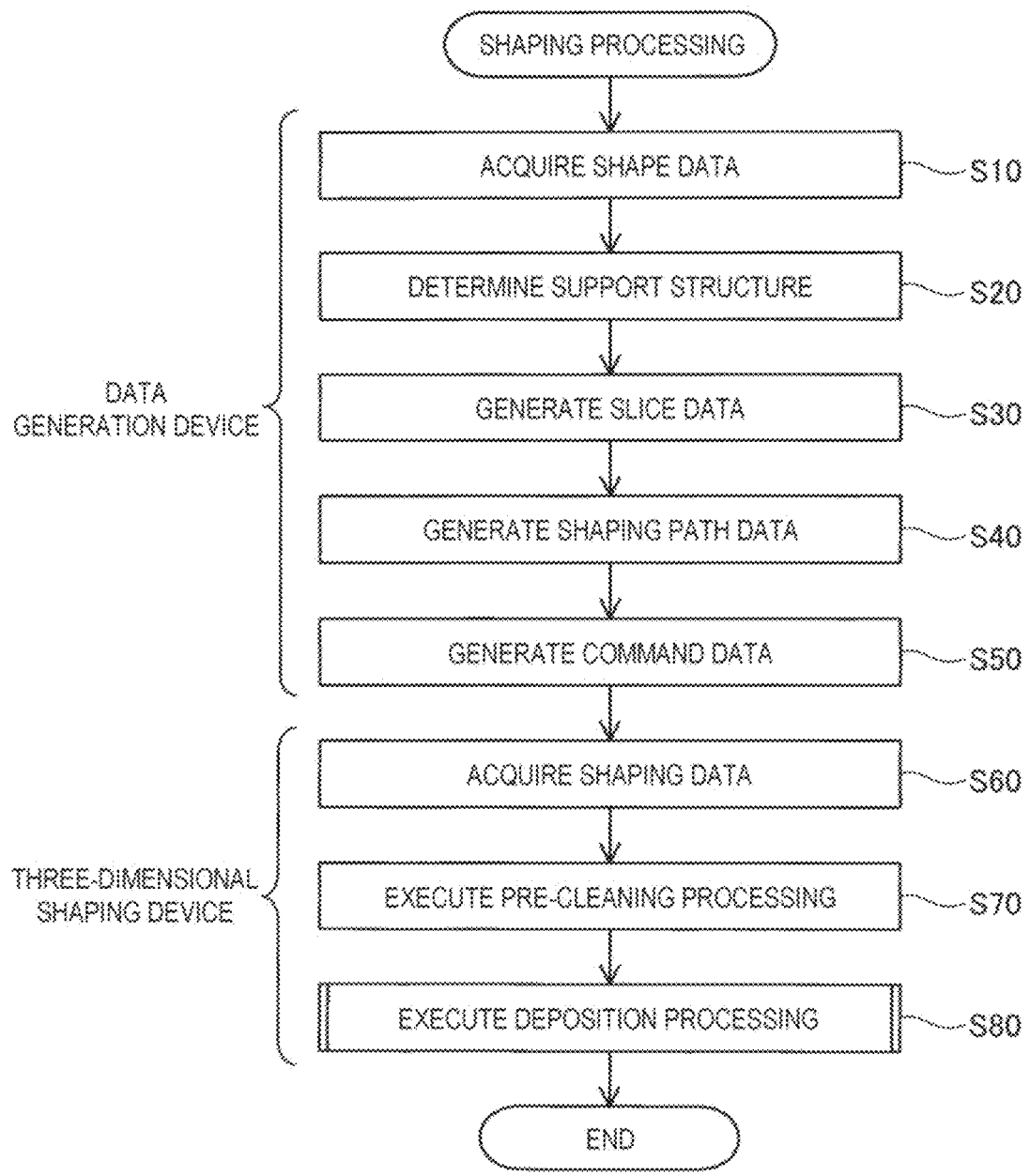
FIG. 10 is a flowchart of shaping processing.

FIG. 10 is a flowchart of shaping processing executed in the three-dimensional shaping system 200. The shaping processing is executed, for example, when a predetermined start operation is performed by a user on the control unit 70. The processing in steps S10 to S50 shown in FIG. 10 are executed in the data generation device 400, and the processing in steps S60 to S80 are executed in the three-dimensional shaping device 100. The three-dimensional shaped object shaped by the shaping processing according to the embodiment includes a main body portion and a support structure that supports the main body portion.

In step S10, the data generation unit 411 acquires shape data representing a shape of the three-dimensional shaped object from another computer, a recording medium, or the storage device 430. In the embodiment, the data generation unit 411 acquires three-dimensional shape data representing a shape of the main body portion as shape data in step S10. For example, data in STL format, AMF format, or the like created using three-dimensional CAD software, three-dimensional CG software, or the like can be used as the shape data.

In step S20, the data generation unit 411 determines a shape of the support structure by analyzing the shape data acquired in step S10. In step S20, for example, the data generation unit 411 determines the shape of the support structure such that an "overhang portion", which is a protruding portion of the main body portion having no support below, is supported from below by the support structure. In the embodiment, the shape of the three-dimensional shaped object shaped in the shaping processing, that is, the shape of the main body portion and the shape of the support structure are determined by executing steps S10 and S20.

In step S30, the data generation unit 411 generates slice data. The slice data refers to data representing the shape of the three-dimensional shaped object sliced into a plurality of layers. More specifically, the data generation unit 411 generates the slice data by slicing the shape of the three-dimensional shaped object into the plurality of layers along the XY plane.

In step S40, the data generation unit 411 generates shaping path data. The shaping path data refers to data representing a movement path of the nozzle 151. The shaping path data includes data representing a plurality of linear movement paths. Each movement path included in the shaping path data includes extrusion amount information indicating an extrusion amount of the shaping material extruded in the movement path. The data generation unit 411 generates the shaping path data and the extrusion amount information for all the layers of the three-dimensional shaped object generated by slicing, thereby generating shaping path data.

In step S50, the data generation unit 411 generates command data for the control unit 70 to control the units of the three-dimensional shaping device 100 in the shaping processing. In the embodiment, the data generation unit 411 generates the command data by adding command data to the shaping path data in step S50. Hereinafter, the shaping path data to which the command data is added is also referred to as shaping data.

Figure 11:
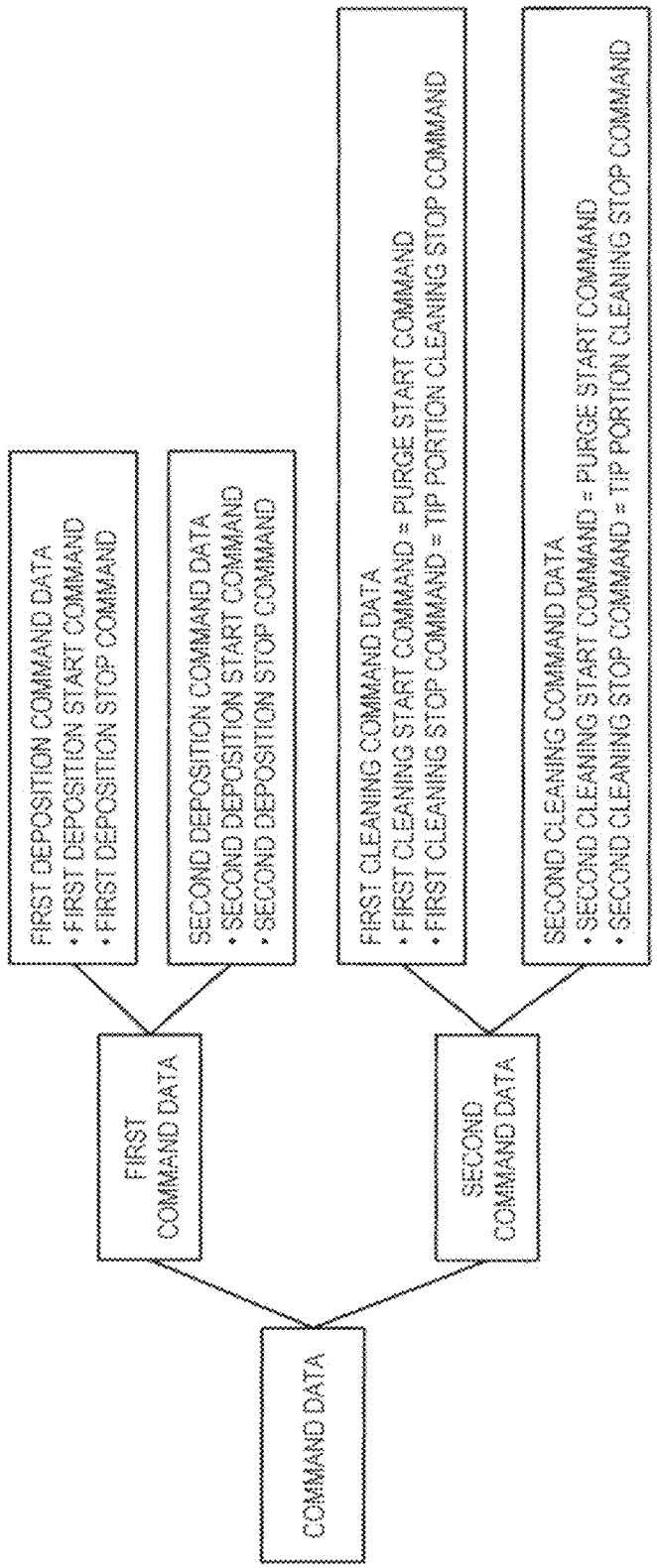
FIG. 11 is a diagram showing command data.

FIG. 11 is a diagram showing the command data according to the embodiment. As shown in FIG. 11, the command data can be classified into first command data and second command data. The first command data refers to data representing a command to deposit layers of the shaping material according to the shaping path data. The second command data refers to command data to clean the nozzle 151. More specifically, the second command data is command data to clean the nozzle 151 after a timing at which first extrusion to shape the three-dimensional shaped object is performed. Hereinafter, the "first extrusion to shape the three-dimensional shaped object" is also simply referred to as "first extrusion".

As shown in FIG. 11, the first command data can be classified into first deposition command data and second deposition command data. The first deposition command data is data representing a command to deposit layers of the first shaping material in the shaping region by extruding the first shaping material from the first nozzle 151*a* according to the movement path included in the shaping path data. The first deposition command data is used to execute first deposition processing to be described later. The second deposition command data is data representing a command to deposit layers of the second shaping material in the shaping region by extruding the second shaping material from the second nozzle 151*b* according to the movement path included in the shaping path data. The second deposition command data is used to execute second deposition processing to be described later.

The first deposition command data includes a first deposition start command and a first deposition stop command. The first deposition start command is a command to start deposition of the layers of the first shaping material by starting extrusion of the first shaping material from the first nozzle 151*a*. The first deposition stop command is a command to stop the deposition of the layers of the first shaping material by stopping the extrusion of the first shaping material from the first nozzle 151*a*. The first deposition start command according to the embodiment is a command to start movement of the first head 10*a* according to the shaping path data, discharging the shaping material in the suction unit 156 to the flow path 153, and controlling the extrusion adjustment unit 154 to increase the opening degree of the flow path 153 from zero. The first deposition stop command is a command to stop the movement of the first head 10*a* according to the shaping path data, controlling the extrusion adjustment unit 154 to set the opening degree of the flow path 153 to zero, and sucking the shaping material in the flow path 153 into the suction unit 156. Hereinafter, the first deposition start command is also simply referred to as a deposition start command. The first deposition stop command is also simply referred to as a deposition stop command.

The first deposition start command and the first deposition stop command each designate control values for the units such as the position changing unit 30, the extrusion adjustment unit 154, and the suction unit 156. The control value for the position changing unit 30 includes, for example, a control value to control each electric actuator of the position changing unit 30. The control value for the extrusion adjustment unit 154 includes, for example, a control value to control a rotation angle of the butterfly valve. More specifically, the control value is, for example, a control value for a drive unit that drives the extrusion adjustment unit 154. The control value for the suction unit 156 includes, for example, a control value to control a position of the plunger. More specifically, the control value is, for example, a control value for a drive unit that drives the suction unit 156. In another embodiment, the first deposition start command or the first deposition stop command may designate, for example, a control value for the plasticizing unit 12. The control value for the plasticizing unit 12 includes, for example, a control value to control a rotation speed of the screw 110, a temperature of the plasticizing heater 144, and a pressure value of the screw 110. For example, when the suction unit 156 is not provided in the three-dimensional shaping device 100, the first deposition start command or the first deposition stop command may not designate the control value for the suction unit 156.

An execution time of the first deposition command data corresponds to a first extrusion time. The first extrusion time represents a time when the first shaping material is extruded according to the first deposition command data. In the embodiment, the execution time of the first deposition command data is set to the same time as the first extrusion time. As a time when the layers of the first shaping material are deposited according to a main body path corresponding to the first deposition command data, the first extrusion time is determined by a length of the main body path and a movement speed of the first nozzle 151*a* moving along the main body path. For example, a movement speed of the nozzle 151 may be set by the user as a shaping condition to shape the three-dimensional shaped object, or may be determined by the control unit 70 or the data generation unit 411 without depending on the user. Hereinafter, the first extrusion time is also simply referred to as an extrusion time.

The second deposition command data includes a second deposition start command and a second deposition stop command in substantially the same manner as the first deposition command data. The second deposition start command is a command to start deposition of the layers of the second shaping material by starting extrusion of the second shaping material from the second nozzle 151*b*. The second deposition stop command is a command to stop the deposition of the layers of the second shaping material by stopping the extrusion of the second shaping material from the second nozzle 151*b*. An execution time of the second deposition command data corresponds to a second extrusion time in substantially the same manner as the execution time of the first deposition command data. The second extrusion time represents a time when the second shaping material is extruded according to the second deposition command data. In the embodiment, the execution time of the second deposition command data is set to the same time as the second extrusion time.

The second command data can be classified into first cleaning command data and second cleaning command data. The first cleaning command data is used to execute first cleaning processing to be described later. The second cleaning command data is used to execute second cleaning processing to be described later. In the embodiment, the first cleaning command data and the second cleaning command data include a purge command and a tip portion cleaning command. The purge command is a command to execute the purge processing described above, and includes a purge start command to start the purge processing and a purge stop command to stop the purge processing. The tip portion cleaning command is a command to execute the tip portion cleaning processing described above, and includes a tip portion cleaning start command to start the tip portion cleaning processing and a tip portion cleaning stop command to stop the tip portion cleaning processing. In the embodiment, the purge command is a command executed after the tip portion cleaning command. Hereinafter, the second cleaning command data is also simply referred to as cleaning command data.

The first cleaning command data includes a first cleaning start command to start cleaning of the first nozzle 151*a* and a first cleaning stop command to stop cleaning of the first nozzle 151*a*. The second cleaning command data includes a second cleaning start command to start cleaning of the second nozzle 151*b* and a second cleaning stop command to stop cleaning of the second nozzle 151*b*. In the embodiment, the purge start command included in the first cleaning command data corresponds to the first cleaning start command, and the purge start command included in the second cleaning command data corresponds to the second cleaning start command. The tip portion cleaning stop command included in the first cleaning command data corresponds to the first cleaning stop command, and the tip portion cleaning stop command included in the second cleaning command data corresponds to the second cleaning stop command. Hereinafter, the second cleaning start command is also simply referred to as a cleaning start command. The second cleaning stop command is also simply referred to as a cleaning stop command.

An execution time of the second cleaning command data corresponds to a second cleaning time. The second cleaning time represents a time required to clean the second nozzle 151*b* by the second cleaning processing. In the embodiment, the execution time of the second cleaning command data is the same as the second cleaning time. A length of the second cleaning time is determined according to a content of the second cleaning processing, and is longer, for example, when an amount of the second shaping material discharged from the second nozzle 151*b* in the purge processing is larger, or when the number of times the cleaning member 221 is rubbed against the nozzle 151 in the tip portion cleaning processing is larger. The content of the second cleaning processing is set such that the execution time of the second cleaning command data is equal to or shorter than the execution time of the first deposition command data. Similarly, an execution time of the first cleaning command data corresponds to a first cleaning time. The first cleaning time represents a time required to clean the first nozzle 151*a* by the first cleaning processing. In the embodiment, the execution time of the first cleaning command data is the same as the first cleaning time.

In step S50 in FIG. 10, the data generation unit 411 generates the first deposition command data corresponding to a main body path that is a movement path to generate the main body portion, and generates the second deposition command data corresponding to a support path that is a movement path to generate the support structure, based on the shaping path data. In step S50, the data generation unit 411 generates the second cleaning command data corresponding to the first deposition command data, and generates the first cleaning command data corresponding to the second deposition command data.

In step S50, the data generation unit 411 generates the second cleaning start command and the second cleaning stop command as commands to be executed between the first deposition start command and the first deposition stop command. More specifically, the data generation unit 411 first generates the second cleaning stop command as a command to be executed at the same timing as the first deposition stop command. An execution timing of the first deposition stop command in certain first deposition command data is calculated based on an execution time of the first deposition command data. Next, the data generation unit 411 generates the second cleaning start command as a command to be executed at a timing going back by an execution time of the second cleaning command data from an execution timing of the second cleaning stop command. In the embodiment, in step S50, the data generation unit 411 generates the first cleaning start command and the first cleaning stop command as commands to be executed between the second deposition start command and the second deposition stop command in substantially the same manner as the second cleaning start command and the second cleaning stop command.

In step S60, the control unit 70 of the three-dimensional shaping device 100 acquires the shaping data generated by the data generation device 400 from the data generation device 400.

In step S70, the control unit 70 of the three-dimensional shaping device 100 executes pre-cleaning processing. The pre-cleaning processing refers to processing of cleaning the first head 10a and the second head 10b, which is executed prior to the first extrusion in the shaping processing. For example, the purge processing or the tip portion cleaning processing described above is executed in the pre-cleaning processing. In step S70, for example, the first head 10a and the second head 10b may be simultaneously cleaned by the cleaning part 60.

In step S80, the control unit 70 executes deposition processing. The deposition processing refers to processing of depositing layers of the shaping material in the shaping region by extruding the shaping material from the nozzle 151 while moving the nozzle 151 according to the shaping path data. In the deposition processing according to the embodiment, the control unit 70 executes first deposition processing, second deposition processing, first cleaning processing, and second cleaning processing.

The first deposition processing refers to processing of depositing layers of the first shaping material in the shaping region by extruding the first shaping material from the first nozzle 151a while changing relative positions of the first head 10a and the stage 20. The second deposition processing refers to processing of depositing layers of the second shaping material in the shaping region by extruding the second shaping material from the second nozzle 151b while changing relative positions of the second head 10b and the stage 20 after the second cleaning processing. The first cleaning processing refers to processing of cleaning the first nozzle 151a using the cleaning part 60. The second cleaning processing refers to processing of cleaning the second nozzle 151b using the cleaning part 60. More specifically, the first cleaning processing and the second cleaning processing are executed after a timing at which the first extrusion is started.

Figure 12:
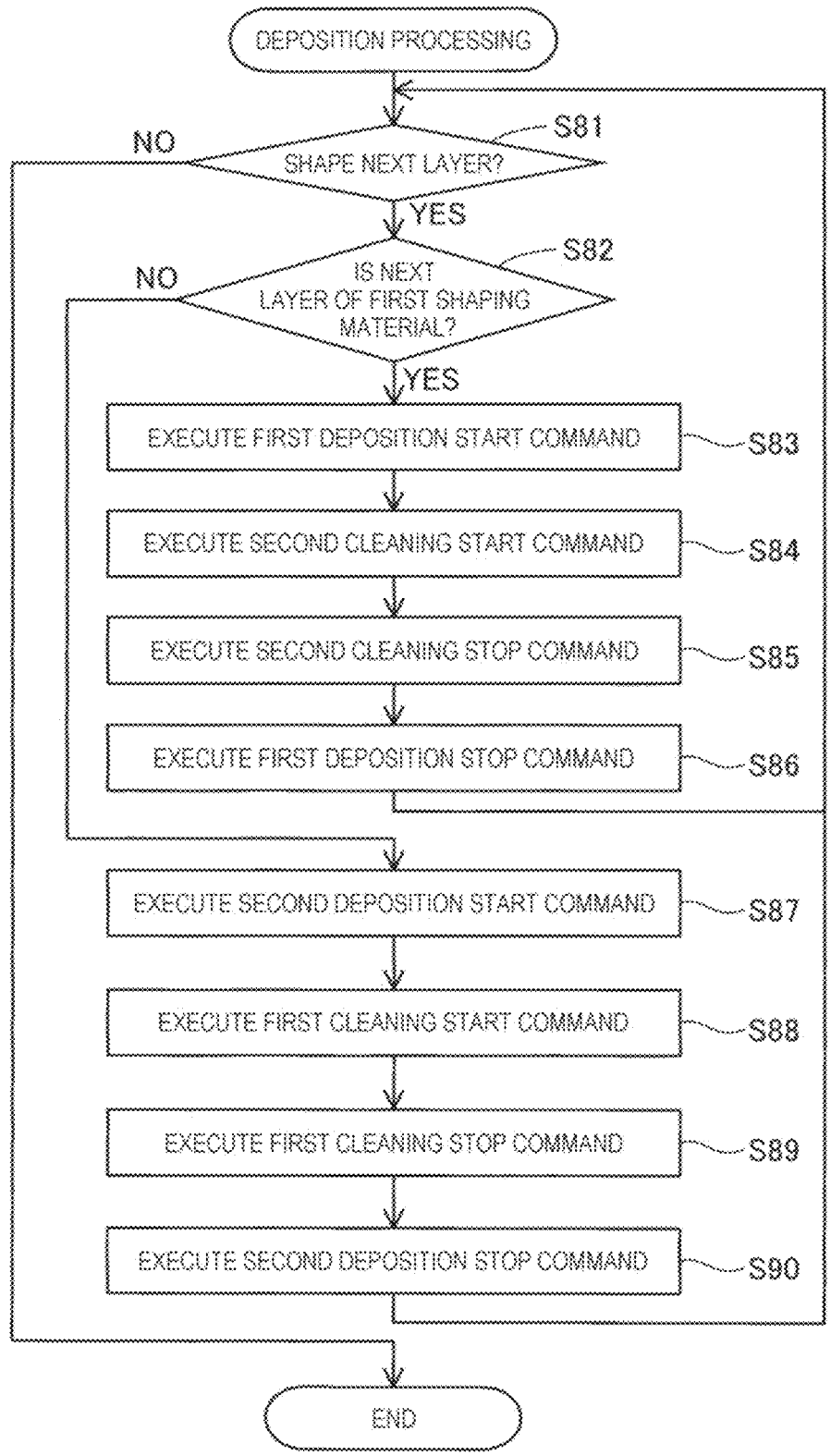
FIG. 12 is a flowchart of deposition processing.
Figure 13:
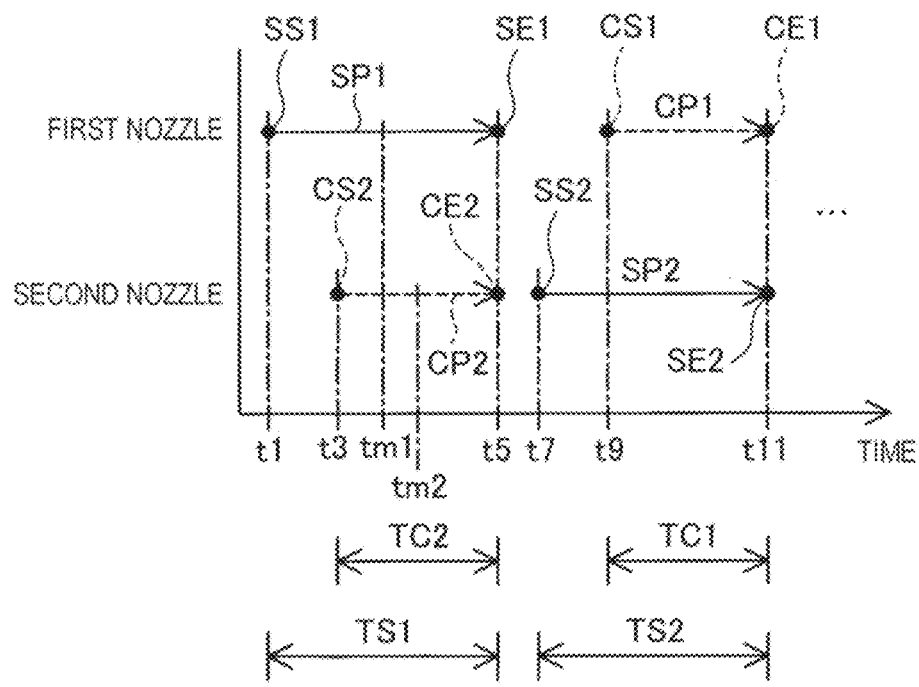
FIG. 13 is an explanatory diagram showing an example of a state in which the deposition processing according to a first embodiment is executed.

FIG. 12 is a flowchart of the deposition processing executed in step S80 in FIG. 10. FIG. 13 is an explanatory diagram showing an example of a state in which the deposition processing according to the embodiment is executed. In FIG. 13, each processing executed in the deposition processing is distinguished into processing related to the first nozzle 151a and processing related to the second nozzle 151b, and is shown in time series. More specifically, the processing related to the first nozzle 151a is first deposition processing SP1 and first cleaning processing CP1. The processing related to the second nozzle 151b is second deposition processing SP2 and second cleaning processing CP2. In FIG. 13, time elapses as it advances to the right along a time axis.

In step S81 in FIG. 12, the control unit 70 determines whether to shape a next layer based on the shaping data. More specifically, the control unit 70 determines whether deposition of all the layers is completed at a time point of execution in step S81 based on the shaping data, and determines to shape the next layer when the deposition of all the layers is not completed. Therefore, in step S81 to be executed first, the control unit 70 determines to shape the next layer. When determining that the next layer is not to be shaped, the control unit 70 ends the deposition processing.

In step S82, the control unit 70 determines whether the next layer is a layer of the first shaping material based on the shaping data. When it is determined in step S82 that the next layer is the layer of the first shaping material, the first nozzle 151a is used in shaping the next layer. When it is determined in step S82 that the next layer is not the layer of the first shaping material, the second nozzle 151b is used in shaping the next layer. FIG. 13 shows a state in which it is determined in step S82 at a first time that the next layer is the layer of the first shaping material, and it is determined in step S82 at a second time that the next layer is not the layer of the first shaping material.

When it is determined in step S82 that the next layer is the layer of the first shaping material, in step S83, the control unit 70 starts the first deposition processing SP1 by executing a first deposition start command SS1 according to second shaping data. FIG. 13 shows a state in which the first deposition start command SS1 is executed at a time point t1.

In step S84, the control unit 70 starts the second cleaning processing CP2 by executing a second cleaning start command CS2 according to the shaping data. FIG. 13 shows a state in which the second cleaning start command CS2 is executed at a time point t3. The time point t3 is a time point when a time corresponding to a difference between a length of an execution time TS1 of the first deposition processing SP1 and a length of an execution time TC2 of the second cleaning processing CP2 has elapsed from the time point t1. The execution time TS1 is the same time as an execution time of the first deposition command data corresponding to the first deposition processing SP1, and is the same time as the first extrusion time in the embodiment. The execution time TC2 is the same as an execution time of the second cleaning command data corresponding to the second cleaning processing CP2, and is the same as the second cleaning time in the embodiment.

In step S85, the control unit 70 ends the second cleaning processing CP2 by executing a second cleaning stop command CE2 according to the shaping data. FIG. 13 shows a state in which the second cleaning stop command CE2 is executed at a time point t5. The time point t5 is a time point when the execution time TC2 has elapsed from the time point t3. The time point t5 is also a time point when the execution time TS1 has elapsed from the time point t1.

In step S86, the control unit 70 ends the first deposition processing SP1 by executing a first deposition stop command SE1 according to the shaping data. FIG. 13 shows a state in which the first deposition stop command SE1 is executed simultaneously with the second cleaning stop command CE2 at the time point t5. The first deposition stop command SE1 may be executed after an execution timing of the second cleaning stop command CE2 in another embodiment. After completion of step S86, the control unit 70 returns the processing to step S81.

When determining in step S82 that the next layer is not the layer of the first shaping material, in step S87, the control unit 70 starts the second deposition processing SP2 by executing a second deposition start command SS2 according to the second shaping data. FIG. 13 shows a state in which the second deposition start command SS2 is executed at a time point t7.

In step S88, the control unit 70 starts the first cleaning processing CP1 by executing a first cleaning start command CS1 according to the shaping data. FIG. 13 shows a state in which the first cleaning start command CS1 is executed at a time point t9. The time point t9 is a time point when a time corresponding to a difference between a length of an execution time TS2 of the second deposition processing SP2 and a length of an execution time TC1 of the first cleaning processing CP1 has elapsed from the time point t7. The execution time TS2 is the same as an execution time of the second deposition command data corresponding to the second deposition processing SP2. The execution time TC1 is the same as an execution time of the first cleaning command data corresponding to the first cleaning processing CP1.

In step S89, the control unit 70 ends the first cleaning processing CP1 by executing a first cleaning stop command CE1 according to the second shaping data. FIG. 13 shows a state in which the first cleaning stop command CE1 is executed at a time point t11. The time point t11 is a time point when the execution time TC1 has elapsed from the time point t9. The time point t11 is also a time point when the execution time TS2 has elapsed from the time point t7.

In step S90, the control unit 70 ends the second deposition processing SP2 by executing a second deposition stop command SE2 according to the second shaping data. FIG. 13 shows a state in which the second deposition stop command SE2 is executed simultaneously with the first cleaning stop command CE1 at the time point t11. The second deposition stop command SE2 may be executed after an execution timing of the first cleaning stop command CE1, in substantially the same manner as the first deposition stop command SE1. After completion of step S90, the control unit 70 returns the processing to step S81.

As shown in FIG. 13, the time point t3 corresponding to a timing at which the second cleaning processing CP2 is started and the time point t5 corresponding to a timing at which the second cleaning processing CP2 is ended are included in a period during which the first deposition processing SP1 is being executed. In the embodiment, the time point t9 corresponding to a timing at which the first cleaning processing CP1 is started and the time point t11 corresponding to a timing at which the first cleaning processing CP1 is ended are included in a period during which the second deposition processing SP2 is being executed.

In the embodiment, an intermediate time point tm2 in a period during which the second cleaning processing CP2 is executed is after an intermediate time point tm1 in the period during which the first deposition processing SP1 is executed. More specifically, in the embodiment, a fact that the time point tm2 is after the time point tm1 is implemented by completing the second cleaning processing CP2 and the first deposition processing SP1 at the same time point t5. Completion of the second cleaning processing CP2 and the first deposition processing SP1 at the same time point is implemented by generating command data such that the second cleaning stop command CE2 and the first deposition stop command SE1 are executed at the same timing. In the embodiment, an intermediate time point in a period during which the first cleaning processing CP1 is executed is after an intermediate time point in the period during which the second deposition processing SP2 is executed, in substantially the same manner as the time point tm2.

According to the three-dimensional shaping device 100 in the embodiment described above, the control unit 70 executes the first deposition processing of depositing layers of the first shaping material in the shaping region, the second cleaning processing of cleaning the second nozzle 151b using the cleaning part 60, and the second deposition processing of depositing layers of the second shaping material in the shaping region after the second cleaning processing. A start timing and an end timing of the second cleaning processing are each included in a period during which the first deposition processing is being executed. In this way, since cleaning of the second nozzle 151b is completed while the first deposition processing is being executed, it is possible to prevent occurrence of a waiting time when the three-dimensional shaped object is not actually shaped during shaping due to cleaning of the second nozzle 151b, from completion of the first deposition processing to a start of the second deposition processing. Therefore, there is a high possibility that an entire shaping time required to shape the three-dimensional shaped object can be shortened.

In the embodiment, a start timing and an end timing of the first cleaning processing are each included in a period during which the second deposition processing is being executed. Therefore, it is possible to prevent occurrence of a waiting time when the three-dimensional shaped object is not actually shaped during the shaping due to cleaning of the first nozzle 151a, from completion of the second deposition processing to a start of the first deposition processing. Therefore, the possibility that the entire shaping time can be shortened is further increased.

In the embodiment, the intermediate time point tm2 in the period during which the second cleaning processing is executed is after the intermediate time point tm1 in the period during which the first deposition processing is executed. In this way, it is possible to further shorten a time from completion of the second cleaning processing to the start of the second deposition processing as compared with a case where the time point tm2 is before the time point tm1. Therefore, for example, it is possible to prevent the second shaping material used in the purge processing from staying in the vicinity of the second nozzle opening 152b in the second nozzle 151b and to prevent new foreign matter from adhering to the second tip portion tp2 once cleaned in the tip portion cleaning processing from the completion of the second cleaning processing to the start of the second deposition processing. Therefore, it is possible to further improve quality of the second shaping material extruded in the second deposition processing, and to further prevent falling of foreign matter from the second tip portion tp2 to the shaping region in the second deposition processing, whereby it is possible to further improve shaping accuracy in the second deposition processing. Therefore, it is possible to further improve the shaping accuracy of the three-dimensional shaped object.

In the embodiment, the cleaning unit 220 includes at least one of the collection portion 224 that collects the second shaping material discharged from the second nozzle 151b and the cleaning member 221 that removes foreign matter adhering to the second tip portion tp2 by contact with the second tip portion tp2 of the second nozzle 151b. The cleaning unit 220 is configured such that a position thereof relative to the stage 20 changes together with the first head 10a and the second head 10b, and is located below the second nozzle 151b while the cleaning processing is being executed. In this way, the second nozzle 151b can be easily cleaned by the cleaning unit 220 in a configuration in which the position of the second head 10b relative to the stage 20 changes together with the first head 10a. In the embodiment, the cleaning unit 220 is disposed above the heating unit 40 and is configured such that a position thereof relative to the stage 20 changes together with the heating unit 40, and thus the nozzle 151 can be easily cleaned by the cleaning unit 220 above the heating unit 40 while the shaping material on the stage 20 is heated by the heating unit 40 below the heating unit 40.

B. Second Embodiment

Figure 14:
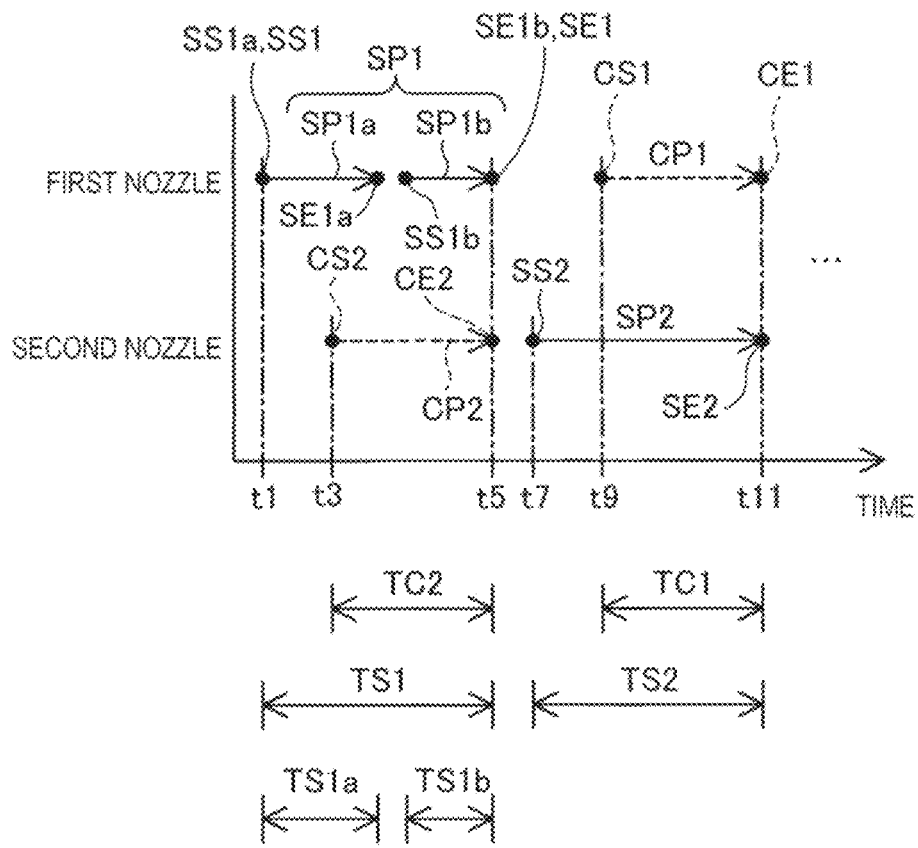
FIG. 14 is an explanatory diagram showing an example of a state in which deposition processing according to a second embodiment is executed.

FIG. 14 is an explanatory diagram showing an example of a state in which deposition processing according to a second embodiment is executed. In FIG. 14, similar to FIG. 13, each processing executed in the deposition processing is shown in time series. In the embodiment, different from the first embodiment, the control unit 70 continuously deposits two or more layers of the first shaping material in one time of first deposition processing. In configurations of the three-dimensional shaping device 100 and the data generation device 400 according to the embodiment, portions not particularly described are the same as those in the first embodiment.

The above-described "continuously depositing two or more layers of the first shaping material" refers to depositing two or more layers of the first shaping material without depositing layers of a shaping material other than the first shaping material during the process. While the two or more layers of the first shaping material are continuously deposited, a timing at which extrusion of the first shaping material is temporarily stopped may be included as long as a layer other than the first shaping material is not deposited during the process. For example, when an n-th layer and an (n+1)-th layer are continuously deposited, extrusion of the first shaping material may be temporarily stopped at a timing when deposition of the n-th layer is completed, and the extrusion of the first shaping material may be resumed at a timing when deposition of the (n+1)-th layer is started. Note that n is any natural number.

In the embodiment, the control unit 70 continuously deposits two layers of the first shaping material without depositing layers of the second shaping material during the process in one time of first deposition processing. The first deposition processing SP1 shown in FIG. 14 includes processing SP1$a$ and processing SP1$b$. The processing SP1$a$ is processing of depositing a lower layer in the two layers deposited by the first deposition processing SP1. The processing SP1$b$ is processing of depositing an upper layer in the two layers. The processing SP1$a$ is started when a start command SS1$a$ is executed, and ends when a stop command SE1$a$ is executed. The processing SP1$b$ is started when a start command SS1$b$ is executed, and ends when a stop command SE1$b$ is executed. When the stop command SE1$a$ is executed, extrusion of the first shaping material is temporarily stopped, but the first deposition processing SP1 does not end. The extrusion of the first shaping material temporarily stopped by the stop command SE1$a$ is resumed by the start command SS1$b$ being executed. In the example in FIG. 14, the start command SS1$a$ corresponds to the first deposition start command SS1. The stop command SE1$b$ corresponds to the first deposition stop command SE1.

In the example in FIG. 14, the execution time TS1 of the first deposition processing SP1 is longer than a total time of an execution time TS1$a$ of the processing SP1$a$ and an execution time TS1$b$ of the processing SP1$b$. More specifically, the execution time TS1 includes the execution time TS1$a$, the execution time TS1$b$, and a time of movement of the nozzle 151 from the lower layer to the upper layer.

According to the three-dimensional shaping device 100 in the embodiment described above, the control unit 70 continuously deposits two or more layers of the first shaping material in one time of first deposition processing. In this way, an execution time of the first deposition processing is longer than in a case where only one layer of the first shaping material is deposited in one time of first deposition processing. Therefore, the start timing and the end timing of the second cleaning processing are easily included in the period during which the first deposition processing is being executed.

C. Third Embodiment

Figure 15:
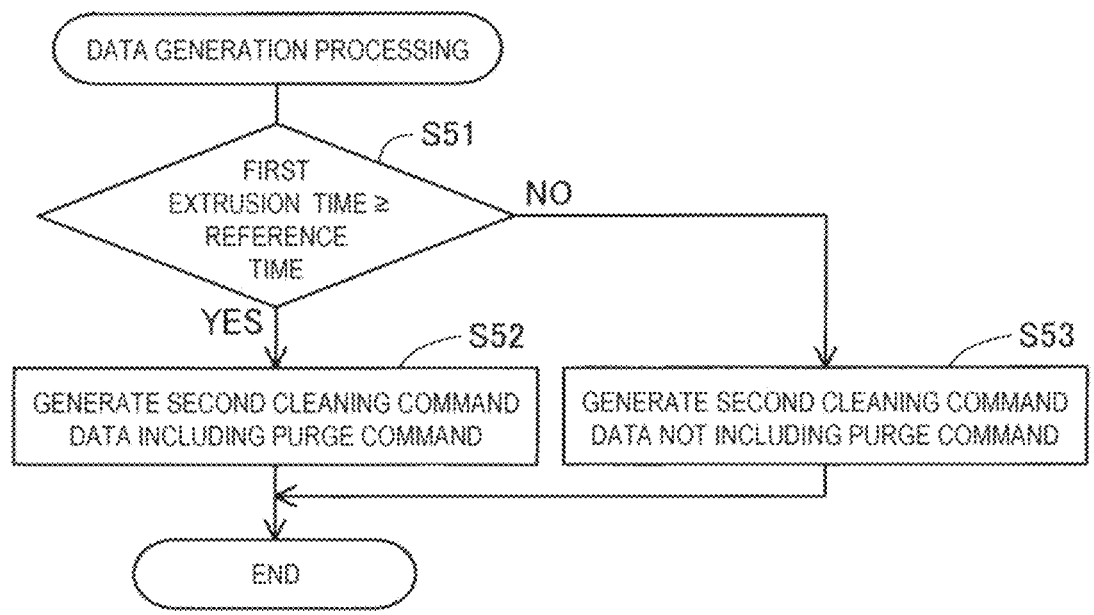
FIG. 15 is a flowchart of data generation processing.

FIG. 15 is a flowchart of data generation processing. In the embodiment, different form the first embodiment, the data generation unit 411 executes determination processing to be described later when generating command data. In configurations of the three-dimensional shaping device 100 and the data generation device 400 according to the embodiment, portions not particularly described are the same as those in the first embodiment.

The data generation processing shown in FIG. 15 is executed in step S50 in FIG. 10. More specifically, when the data generation unit 411 generates the first deposition command data and the second cleaning command data corresponding to the main body path in S50 in FIG. 10, the data generation unit 411 executes the data generation processing shown in FIG. 15.

In step S51, the data generation unit 411 executes determination processing. The determination processing refers to processing of determining whether a first extrusion time is equal to or longer than a predetermined reference time. The reference time is determined based on, for example, an execution time of the purge processing, and in the embodiment, is determined as a total time of the execution time of the purge processing and an execution time of the tip portion cleaning processing.

When the data generation unit 411 determines that the first extrusion time is equal to or longer than the reference time in step S51, the processing proceeds to step S52. In step S52, the data generation unit 411 generates second cleaning command data including a purge command to discharge the second shaping material from the second nozzle 151$b$ as the second cleaning command data corresponding to the first deposition command data subjected to the determination processing in step S51. More specifically, in the embodiment, the data generation unit 411 generates the second cleaning command data including the purge command and a tip portion cleaning command in step S52. On the other hand, when the data generation unit 411 determines that the first extrusion time is not equal to or longer than the reference time in step S51, the processing proceeds to step S53. In step S53, the data generation unit 411 generates second cleaning command data not including a purge command, as the second cleaning command data corresponding to the first deposition command data subjected to the determination processing. That is, when the first extrusion time is shorter than the reference time, the data generation unit 411 generates the second cleaning command data not including the purge command. More specifically, in the embodiment, the data generation unit 411 generates the second cleaning command data including only the tip portion cleaning command in step S53.

According to the data generation device 400 according to the embodiment described above, the data generation unit 411 generates the second cleaning command data including the purge command when the first extrusion time is equal to or longer than the reference time, and generates the second cleaning command data not including the purge command when the first extrusion time is shorter than the reference time. In this way, an execution time of the second cleaning command data generated when the first extrusion time is shorter than the reference time can be shortened by an execution time of the purge command as compared with the second cleaning command data generated when the first extrusion time is equal to or longer than the reference time. Therefore, even when the first extrusion time is relatively short, a second cleaning start command and a second cleaning stop command can be easily generated as commands to be executed between a first deposition start command and a first deposition stop command. When the first extrusion time is equal to or longer than the reference time, the second cleaning command data can be generated such that the second nozzle 151*b* is purged. Therefore, for example, it is possible to improve quality of the second shaping material extruded in the second deposition processing as compared with a configuration in which the second cleaning command data is uniformly generated as a command not including the purge command.

D. Other Embodiments (D-1) In the above embodiment, the intermediate time point in the period during which the second cleaning processing is executed is after the intermediate time point in the period during which the first deposition processing is executed. Alternatively, the intermediate time point in the period during which the second cleaning processing is executed may be before the intermediate time point in the period during which the first deposition processing is executed. For example, in step S50 in FIG. 10, when the data generation unit 411 generates the second cleaning start command as a command to be executed at the same timing as the first deposition start command, the intermediate time point in the period during which the second cleaning processing is executed is before the intermediate time point in the period during which the first deposition processing is executed.

(D-2) The cleaning unit 220 is configured such that the position thereof relative to the stage 20 changes together with the first head 10*a* and the second head 10*b* in the above embodiment, but may not be implemented in this manner. For example, a position of the second head 10*b* relative to the stage 20 may change independently of the first head 10*a*, and in the second cleaning processing, the second head 10*b* may be moved to the collection portion 224 or the cleaning member 221 whose position is fixed with respect to the stage 20. Similarly, in the first cleaning processing, the first head 10*a* may be moved to the collection portion 224 or the cleaning member 221 whose position is fixed. The cleaning unit 220 may be configured such that the position thereof relative to the stage 20 changes independently of the first head 10*a* and the second head 10*b*.

(D-3) Two cleaning units 220 are provided corresponding to the first nozzle 151*a* and the second nozzle 151*b* in the above embodiment, but the number of cleaning units 220 may not correspond to the number of nozzles 151 and heads 10. For example, only one cleaning unit 220 may be provided, and the first nozzle 151*a* and the second nozzle 151*b* may be cleaned by the cleaning unit 220.

(D-4) In the above embodiment, the data generation unit 411 generates the command data by adding command data to the shaping path data. Alternatively, the data generation unit 411 may generate the command data as data different from the shaping path data.

(D-5) In the above embodiment, the data generation unit 411 acquires the shape data representing the shape of the main body portion in step S10 in FIG. 10. Alternatively, the data generation unit 411 may acquire, for example, the shape data including the main body portion and the support structure in step S10 in FIG. 10. For example, the data generation unit 411 may not generate the slice data or the shaping path data. For example, the data generation unit 411 may generate the shaping path data based on slice data generated by another slicer software and generate the command data based on the shaping path data, or may generate the command data based on shaping path data generated by another data generation device.

(D-6) A combination of the first shaping material and the second shaping material is a combination of the main body material and the support material in the above embodiment, and may be another combination. For example, the combination of the first shaping material and the second shaping material may be a combination of main body materials of different colors or types. The first shaping material and the second shaping material may be the same main body material. In this case, for example, by alternately repeating cleaning of the second nozzle 151*b* during the shaping by the first nozzle 151*a* and cleaning of the first nozzle 151*a* during the shaping by the second nozzle 151*b*, the three-dimensional shaped object can be efficiently and accurately shaped. When the first shaping material and the second shaping material are main body materials, the three-dimensional shaped object may not include the support structure.

(D-7) The three-dimensional shaping device 100 according to the above embodiment includes two heads 10, and may include three or more heads 10. In this case, a plurality of nozzles 151 other than the first nozzle 151*a* may be simultaneously cleaned in the second cleaning processing. For example, when the three-dimensional shaping device 100 includes three heads 10, the second nozzle 151*b* and the nozzle 151 of the third head 10 may be simultaneously cleaned in the second cleaning processing.

(D-8) In the above embodiment, the plasticizing unit 12 provided in the head 10 plasticizes the material by the flat screw. Alternatively, the plasticizing unit 12 may plasticize the material by, for example, rotating an in-line screw. The plasticizing unit 12 may plasticize a filament-shaped material with a heater.

E. Other Aspects

The present disclosure is not limited to the embodiments described above, and can be implemented in various forms without departing from the scope of the present disclosure. For example, the present disclosure can be implemented in the following aspects. In order to solve a part of or all of problems of the present disclosure, or to achieve a part of or all of effects of the present disclosure, technical features of the above embodiments corresponding to technical features of the following aspects can be replaced or combined as appropriate. The technical features can be deleted as appropriate unless described as essential in the present specification.

(1) According to a first aspect of the present disclosure, a three-dimensional shaping device is provided. The three-dimensional shaping device includes a stage, a first head having a first nozzle that extrudes a first shaping material toward the stage, a second head having a second nozzle that extrudes a second shaping material toward the stage, a position changing unit configured to change relative positions of the first head and the stage and relative positions of the second head and the stage, a cleaning part configured to clean the first nozzle and second nozzle, and a control unit configured to control the first head, the second head, and the position changing unit. The control unit executes first deposition processing of depositing a layer of the first shaping material in a shaping region on the stage by extruding the first shaping material from the first nozzle while changing the relative positions of the first head and the stage, cleaning processing of cleaning the second nozzle using the cleaning part, and second deposition processing of depositing a layer of the second shaping material in the shaping region by extruding the second shaping material from the second nozzle while changing the relative positions of the second head and the stage after the cleaning processing. A timing at which the cleaning processing is started and a timing at which the cleaning processing is ended are included in a period during which the first deposition processing is being executed.

According to this aspect, cleaning of the second nozzle is completed while the first deposition processing is being executed. Therefore, it is possible to prevent occurrence of a waiting time when a three-dimensional shaped object is not actually shaped during shaping due to the cleaning of the second nozzle, from completion of the first deposition processing to a start of the second deposition processing.

(2) In the above aspect, an intermediate time point in a period during which the cleaning processing is executed may be after an intermediate time point in the period during which the first deposition processing is executed. According to this aspect, it is possible to further shorten a time from completion of the cleaning processing to the start of the second deposition processing. Therefore, it is possible to further improve shaping accuracy in the second deposition processing.

(3) In the above aspect, the control unit may continuously deposit two or more layers of the first shaping material in the first deposition processing. According to this aspect, an execution time of the first deposition processing is longer than in a case where only one layer of the first shaping material is deposited in the first deposition processing. Therefore, the timing at which the cleaning processing is started and the timing at which the cleaning processing is ended are easily included in the period during which the first deposition processing is being executed.

(4) In the above aspect, the second head may be configured such that a position relative to the stage changes together with the first head, the cleaning part may include a cleaning unit including at least one of a collection portion configured to collect the second shaping material discharged from the second nozzle and a cleaning member configured to remove foreign matter adhering to a tip portion of the second nozzle by contact with the tip portion of the second nozzle, and the cleaning unit may be configured such that a position relative to the stage changes together with the first head and the second head, and may be located below the second nozzle while the cleaning processing is being executed. According to this aspect, the second nozzle can be easily cleaned by the cleaning unit in a configuration in which the position of the second head relative to the stage changes together with the first head.

(5) According to a second aspect of the present disclosure, there is provided a data generation device that generates command data used in a three-dimensional shaping device including a first head having a first nozzle that extrudes a first shaping material and a second head having a second nozzle that extrudes a second shaping material. The data generation device includes a data generation unit configured to generate the command data based on shaping path data representing a movement path along which the nozzle moves while extruding the shaping material. The data generation unit generates, as the command data, first deposition command data to deposit a layer of the first shaping material in a shaping region on a stage by extruding the first shaping material from the first nozzle along the movement path, cleaning command data representing a command to execute cleaning of the second nozzle, and second deposition command data to deposit a layer of the second shaping material in the shaping region by extruding the second shaping material from the second nozzle along the movement path after the cleaning is executed. The first deposition command data includes a deposition start command to start deposition of the layer of the first shaping material by starting extrusion of the first shaping material from the first nozzle, and a deposition stop command to stop the deposition of the layer of the first shaping material by stopping the extrusion of the first shaping material from the first nozzle. The cleaning command data includes a cleaning start command to start the cleaning and a cleaning stop command to stop the cleaning. The data generation unit generates the cleaning start command and the cleaning stop command as commands to be executed between the deposition start command and the deposition stop command.

(6) In the above aspect, the data generation unit generates the cleaning command data including a purge command to discharge the second shaping material from the second nozzle to a region different from the shaping region when an extrusion time representing a time when the layer of the first shaping material is extruded according to the first deposition command data is equal to or longer than a predetermined reference time, and generates the cleaning command data not including the purge command when the extrusion time is shorter than the reference time. According to this aspect, even when the extrusion time is relatively short, the cleaning start command and the cleaning stop command can be easily generated as commands to be executed between the deposition start command and the deposition stop command. For example, it is possible to improve quality of the second shaping material extruded in the second deposition processing, as compared with a configuration in which the cleaning command data is uniformly generated as a command not including the purge command.

What is claimed is:

1. A data generation device that generates command data used in a three-dimensional shaping device including a first head having a first nozzle that extrudes a first shaping material and a second head having a second nozzle that extrudes a second shaping material, the data generation device comprising:
    an input interface configured to receive shape data representing a shape of a three-dimensional shaped object from an external device;
    a memory configured to store a program; and
    a processor configured to execute the program so as to:
        cause the input interface to receive the shape data;
        generate shaping path data based on the shape data, the shaping path data representing a movement path along which the first and second nozzles move while extruding the first shaping material or the second shaping material; and
        generate the command data based on the shaping data, the command data including:
            first deposition command data to deposit a layer of the first shaping material in a shaping region on a stage by extruding the first shaping material from the first nozzle along the movement path;
            cleaning command data representing a command to execute cleaning of the second nozzle; and
            second deposition command data to deposit a layer of the second shaping material in the shaping region by extruding the second shaping material from the second nozzle along the movement path after the cleaning is executed,
    wherein the first deposition command data includes a deposition start command to start deposition of the layer of the first shaping material by starting extrusion of the first shaping material from the first nozzle, and a deposition stop command to stop the deposition of the layer of the first shaping material by stopping the extrusion of the first shaping material from the first nozzle, the cleaning command data includes a cleaning start command to start the cleaning and a cleaning stop command to stop the cleaning, and the data generation unit generates the cleaning start command and the cleaning stop command as commands to be executed between the deposition start command and the deposition stop command.

2. The data generation device according to claim 1, wherein the processor is further configured to:

generate the cleaning command data including a purge command to discharge the second shaping material from the second nozzle to a region different from the shaping region when an extrusion time representing a time when the layer of the first shaping material is extruded according to the first deposition command data is equal to or longer than a predetermined reference time; and generate the cleaning command data not including the purge command when the extrusion time is shorter than the predetermined reference time.

* * * * *